US010277575B2

(12) United States Patent
Moran et al.

(10) Patent No.: US 10,277,575 B2
(45) Date of Patent: *Apr. 30, 2019

(54) SYSTEM AND METHOD OF PROVIDING IDENTITY VERIFICATION SERVICES

(71) Applicant: United States Postal Service, Washington, DC (US)

(72) Inventors: Timothy M. Moran, National Harbor, MD (US); Jane E. Quenk, Washington, DC (US); Douglas Paul Glair, Baltimore, MD (US); Charles P. McLellan, Washington, DC (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,740

(22) Filed: Mar. 15, 2018

(65) Prior Publication Data

US 2018/0205718 A1    Jul. 19, 2018

Related U.S. Application Data

(63) Continuation of application No. 15/195,885, filed on Jun. 28, 2016, now Pat. No. 9,948,630.

(Continued)

(51) Int. Cl.
| | | |
|---|---|---|
| *H04L 29/06* | (2006.01) | |
| *G06Q 10/08* | (2012.01) | |
| *G06Q 20/40* | (2012.01) | |

(52) U.S. Cl.
CPC ......... *H04L 63/08* (2013.01); *G06Q 10/0833* (2013.01); *H04L 63/083* (2013.01); *H04L 63/126* (2013.01); *G06Q 20/40* (2013.01)

(58) Field of Classification Search
None
See application file for complete search history.

(56) References Cited

U.S. PATENT DOCUMENTS 7,483,862 B1   1/2009 Robinson et al.
7,606,918 B2  10/2009 Holzman et al.
(Continued)

FOREIGN PATENT DOCUMENTS

| CN | 1139894 C   | 2/2004 |
| CN | 101697514 A | 4/2010 |
| CN | 102339441 A | 2/2012 |

OTHER PUBLICATIONS

International Search Report and Written Opinion dated Sep. 19, 2016 for International Patent Application No. PCT/US16/39901.

*Primary Examiner* — Andrew J Steinle
(74) *Attorney, Agent, or Firm* — Knobbe Martens Olson & Bear LLP

(57) ABSTRACT

A system and method of validating an upgrade of authentication credentials includes authenticating a first user being associated with a first entity, receiving input identifying a customer name for the online account, receiving input indicating a type of identification to be presented at the validation event, receiving input indicating a transaction code associated with the validation event, and receiving input indicating a location of the validation event, and further includes authenticating a second user being associated with a second entity, providing to the second user a list of validation events for a location, receiving input selecting a validation event in the list of validation events, presenting one or more of the customer name, transaction code, and type of identification associated with the selected validation event, and receiving input indicating a result of the validation event, where a credential or token is created and assigned based on the validation event.

17 Claims, 56 Drawing Sheets

Related U.S. Application Data

(60) Provisional application No. 62/187,147, filed on Jun. 30, 2015.

(56) References Cited

U.S. PATENT DOCUMENTS

| | | | |
|---|---|---|---|
| 8,150,616 B2 * | 4/2012 | Shimizu | G01C 21/28 |
| | | | 701/417 |
| 8,341,712 B2 | 12/2012 | Machani | |
| 9,015,207 B2 * | 4/2015 | Foit | G06Q 30/0201 |
| | | | 705/14.51 |
| 9,047,617 B2 * | 6/2015 | Sanchez | G06Q 20/40 |
| 9,280,684 B1 | 3/2016 | Kragh et al. | |
| 2002/0029248 A1 | 3/2002 | Cook et al. | |
| 2003/0022676 A1 | 1/2003 | Nakamoto et al. | |
| 2004/0211838 A1 | 10/2004 | O'Callaghan et al. | |
| 2009/0254440 A1 | 10/2009 | Pharris | |
| 2009/0257569 A1 | 10/2009 | Bristow et al. | |
| 2010/0024017 A1 | 1/2010 | Ashfield et al. | |
| 2011/0053559 A1 | 3/2011 | Klein | |
| 2011/0066550 A1 | 3/2011 | Shank et al. | |
| 2012/0089618 A1 | 4/2012 | Anschutz et al. | |
| 2012/0281077 A1 | 11/2012 | Cañero Morales et al. | |
| 2012/0291107 A1 | 11/2012 | Piliouras | |
| 2012/0293642 A1 | 11/2012 | Berini et al. | |
| 2013/0022231 A1 | 1/2013 | Nepomniachtchi et al. | |
| 2013/0027227 A1 | 1/2013 | Nordstrom et al. | |
| 2013/0117862 A1 | 5/2013 | Farrell et al. | |
| 2014/0074733 A1 | 3/2014 | Den Herder et al. | |
| 2014/0258136 A1 | 9/2014 | Ellis | |
| 2014/0279450 A1 * | 9/2014 | Gujral | G06Q 30/04 |
| | | | 705/40 |
| 2014/0279519 A1 | 9/2014 | Mattes et al. | |
| 2015/0032625 A1 * | 1/2015 | Dill | G06Q 20/385 |
| | | | 705/44 |
| 2015/0120536 A1 * | 4/2015 | Talker | G06Q 20/367 |
| | | | 705/39 |
| 2015/0127535 A1 * | 5/2015 | Chavarria | G06Q 20/409 |
| | | | 705/44 |

\* cited by examiner

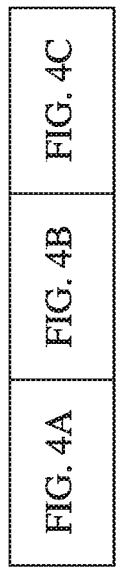

| FIG. 5A | FIG. 5B | FIG. 5C |
|---------|---------|---------|
| FIG. 5D | FIG. 5E | FIG. 5F |

FIG. 5

Sign Into Your Account

Already have an account?
Enter Your Username and Password
* Indicates a required field.

*Username

*Password

Forgot your password?

Sign In — 910

New?
Create a USPS.com Account to...
- Print shipping labels.
- Request a Package Pickup.
- Buy stamps and shop.
- Manage PO boxes.
- Print custom forms online.
- File domestic claims.
- Set a preferred language.

Sign Up Now — 920

— 900

| LEGAL | ON USPS.COM | ON ABOUT USPS.COM | OTHER USPS SITES |
|---|---|---|---|
| Privacy Policy > | Government Services > | About USPS Home > | Business Customer Gateway > |
| Terms of Use > | Buy Stamps & Shop > | Newsroom > | Postal Inspectors > |
| FOIA > | Print a Label with Postage > | USPS Service Alerts > | Inspector General > |
| No FEAR Act EEO Data > | Customer Service > | Forms & Publications > | Postal Explorer > |
| | Delivering Solutions to the Last Mile > | Careers > | |
| | Site Index > | | |

FIG. 9

Secure Account Verification ← 1000

For added security, some USPS applications require additional authentication. To begin the authentication process...

Verify Your Profile Information

To verify your identity, we need to confirm your name, address, and email address.

To edit your information, click, 'Edit Profile Information.'

Name and Address
Test User
13600 EDS Drive
Herndon, VA 20171
Edit Profile Information

Email Address
testuser@test.com

Phone
703-111-1111

Additional Information Needed

Please enter your date of birth and social security number.

*Indicates a required field.

*Date of Birth
[mm/dd/yyyy]

*Re-enter Date of Birth
[mm/dd/yyyy]

*Social Security Number
[9 digits, no dashes]

*Re-enter Social Security Number
[9 digits, no dashes]

To make sure that no one attempts to see, manage, or tamper with your shipments, we must confirm that you are actually you. This is not a credit check. Answers to these questions are for verification only and neither the USPS nor its partners store your answers.

How Your Information is Used...

1. A USPS Service partner will independently verify your information to uniquely resolve your identity.
2. The independent service provider will generate questions that only you should be able to answer.
3. Answers to your questions are not retained by USPS.

[Cancel] [Get Verified] ← 1010

FIG. 10

Verification Questions

A financial service provider generated these questions. USPS does not keep either the information used to create the questions or your answers.

*You must answer every question to verify your identity and address.

*Your credit file indicates you may have a mortgage loan, opened in or around January 2012. Who is the current provider for this account?
- ○ ABC Mortgage
- ○ Citibank
- ○ Suntrust
- ○ Capital One
- ○ None of the Above

*What is your total scheduled monthly payment for the above referenced mortgage?
- ○ $500 - $1,000
- ○ $1,001 - $1,500
- ○ $1,501 - $2,000
- ○ $2,001 - $2,500
- ○ None of the Above

*On which of the following streets have you lived?
- ○ Elm Street
- ○ Oak Grove
- ○ Washington Boulevard
- ○ Whispering Woods
- ○ None of the Above

*Of which of these banking institutions do you have an account?
- ○ Bank of America
- ○ PNC Bank
- ○ USAA Bank
- ○ Wells Fargo
- ○ None of the Above

[Cancel]  [Submit Answers] ~1110

Preferences Summary  1200

Communications Preferences | | Edit All Preferences >
---|---|---
Communications | Current Info | Select an entry to make a change
⑦ Language Preference | English | Change Default Language >
⑦ Communications Preference | From USPS<br>From USPS Partners | Change Communication Preferences >

Security Preference Information

| | | |
---|---|---
Security | Current Info | Select an entry to make a change
⑦ Password | ********* | Change Password >
⑦ Authentication Level | Basic | Upgrade >  — 1210

FIG. 12

In-Person Proofing

*1600*

You have chosen to verify your identity through in-person proofing.

We have sent an email with instructions on in-person proofing to testuser@test.com.

1. Print out a copy of the email, including the barcode. You must have a copy of the bar code to complete the verification process.
2. Take the copy of the barcode to an United State Postal Service® Identity Proofing facility.
3. Bring identification with you. Only current forms of identification are accepted.

Acceptable Forms of Government Issued ID
- State driver's license
  *Requires a secondary form of identification if your address does not match your ID.*
- State non-driver's identification card
  *Requires a secondary form of identification if your address does not match your ID.*
- Uniformed services identification card
  *Requires a secondary form of identification with your address.*
- Passport
  *Requires a secondary form of identification with your address.*

Acceptable Secondary Forms of Identification
- Current lease, mortgage, or deed of trust
- Voter or vehicle registration card
- Home or vehicle insurance policy NOTE: The in-person proofing request will be active for 30 days from the time the email was sent. If the request expires, you must request a new in-person proofing email. You may also retry to verify your identity online.

FIG. 16A

*1610* [Request New In Person Proofing Email]  [Retry Online Identity Verification] —*1620*

*1630*

Nearest USPS Identity Proofing Facilities

These are the closest USPS® identity proofing service facilities to your profile address. To be certain of service, call ahead.

| Distance | Location | Hours |
|---|---|---|
| 1.2 miles | OAK HILL > <br> 13520 MCLEAREN RD <br> HERNDON, VA 20171-9998 <br> 800-ASK-USPS® (800-275-8777) | Mon-Fri 9:00am - 5:00pm <br> Sat 9:00am - 2:00pm <br> Sun Closed <br> Lot Parking Available |
| 2.4 miles | HERNDON > <br> 590 GROVE ST <br> HERNDON, VA 20170-9998 <br> 800-ASK-USPS® (800-275-8777) | Mon-Fri 9:00am - 6:00pm <br> Sat 9:00am - 2:00pm <br> Sun Closed <br> Lot Parking Available |
| 3.9 miles | RESTON > <br> 11110 SUNSET HILLS RD <br> RESTON, VA 20190-9998 <br> 800-ASK-USPS® (800-275-8777) | Mon-Fri 8:30am - 5:00pm <br> Sat 8:30am - 2:00pm <br> Sun Closed <br> Lot Parking Available |
| 4.0 miles | CHANTILLY > <br> 4410 BROOKFIELD CORPORATE DR <br> CHANTILLY, VA 20151-9998 <br> 800-ASK-USPS® (800-275-8777) | Mon-Fri 9:00am - 6:00pm <br> Sat 9:00am - 2:00pm <br> Sun Closed <br> Lot Parking Available |

Search for more USPS facilities >

FIG. 16B

Acceptable Secondary Forms of Identification
- Current lease, mortgage, or deed of trust
- Voter or vehicle registration card
- Home or vehicle insurance policy

} 1730

Please do not reply to this message. Replies are sent to an unmonitored mailbox.

Thank you,
United States Postal Service

*USPS employees will never ask for your username and password. Do not willingly reveal your credentials to anyone that asks.*

Nearest USPS Identity Proofing Facilities

These are the closest USPS® identity proofing service facilities to your profile address. To be certain of service, call ahead.

*In-Person Proofing is a new service and not currently available in every location. We are working to increase the number of participating locations. If the locations listed are not close to your location, we recommend that you retry online identity verification.*

| Location | Hours |
|---|---|
| L'ENFANT PLAZA ><br>470 L'ENFANT PLZ SW STE 604<br>WASHINGTON, DC 20024-9995<br>800-ASK-USPS® (800-275-8777) | Mon-Fri 8:00am - 5:00pm<br>Sat - Sun Closed<br>Street Parking Available |
| BETHESDA ><br>6900 WISCONSIN AVE STE 100<br>CHEVY CHASE, MD 20815-9996<br>800-ASK-USPS® (800-275-8777) | Mon-Fri 9:00am - 5:00pm<br>Sat 9:00am - 4:00pm<br>Sun Closed<br>Street Parking Available |

FIG. 17B

In-Person Proofing

Sign Into Your Account

Restricted System Access

ACE ID

[ Enter ACE ID here ]

Password

[ Enter password here ]

*For login assistance, contact the USPS Help Desk at 800-ASK-USPS® (800-275-8777).*

[ Sign In ]

FIG. 18

In-Person Proofing

Barcode Scan

Scan the barcode provided by the customer to start the proofing process.

[ Scan Barcode ]

If you cannot scan the barcode, enter the barcode numbers below.

Barcode ID
[ 10 digits ]

[ Submit ]

In-Person Proofing

Request Identification

Name: User, Test

Ask the customer for identification to scan on the next screen. All forms of identification must be current.

Accepted forms of identification...
- State driver's license
- State non-driver's identification card
- Uniformed services identification card
- Passport

2110

Accepted secondary forms of identification...
- Lease, mortgage or deed of trust
- Voter or vehicle registration card
- Home or vehicle insurance policy

2120

*Secondary forms of identification are only required when the primary identification does not list an address or has an outdated address.*

2130

[ Next ]

In-Person Proofing

/-2400

Select Secondary Form of ID

Note: Address on secondary form of ID must match the address in the system.

Select the secondary form of identification (must be current) used to verify the customer's address.

/-2410
Lease. Mortgage or Deed of Trust

/-2420
Voter or Vehicle Registration Card

/-2430
Home or Vehicle Insurance Policy

/-2440
No Secondary Form of ID Provided

In-Person Proofing

Validate

Does the presented form(s) of identification match the information provided by the customer below?

Barcode ID: 1234567890

Name: User, Test

Address: 13600 EDS Drive
Herndon, VA 20171

[ Yes ]

In-Person Proofing

Identity Validation Complete

Please inform the customer that the proofing is finished and that they will receive a confirmation email.

Print the validation proofing confirmation code and give it to the customer for reference.

1234567890

The customer can now log into the USPS application and continue the validation process.

[ Print Confirmation Code ]

In-Person Proofing

Select Secondary Form of ID

⊖ Addresses do not match. Request secondary form of ID.

Note: Address on secondary form of ID must match the address in the system.

Select the secondary form of identification (must be current) used to verify the customer's address.

[ Lease, Mortgage or Deed of Trust ]

[ Voter or Vehicle Registration Card ]

[ Home or Vehicle Insurance Policy ]

[ No Secondary Form of ID Provided ]

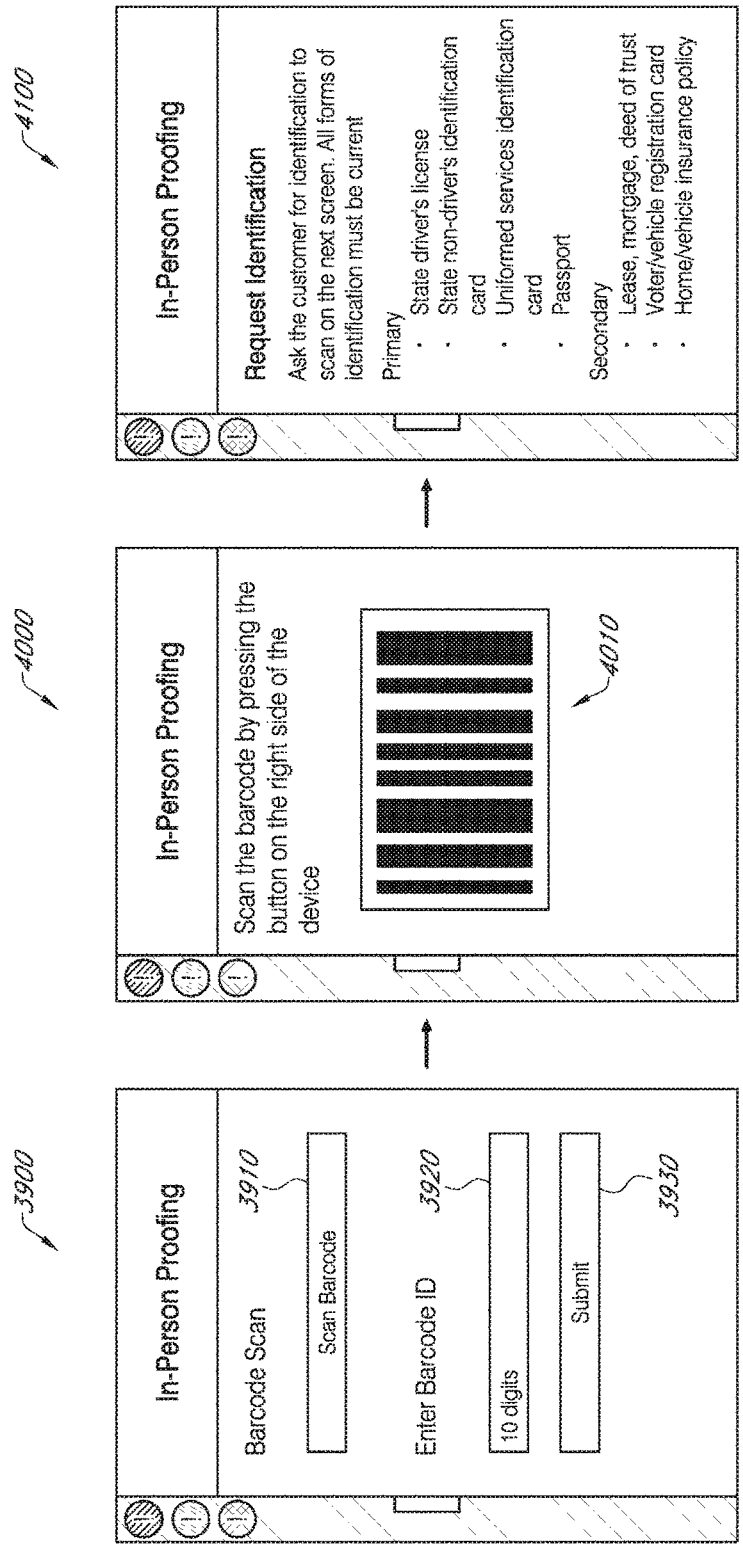

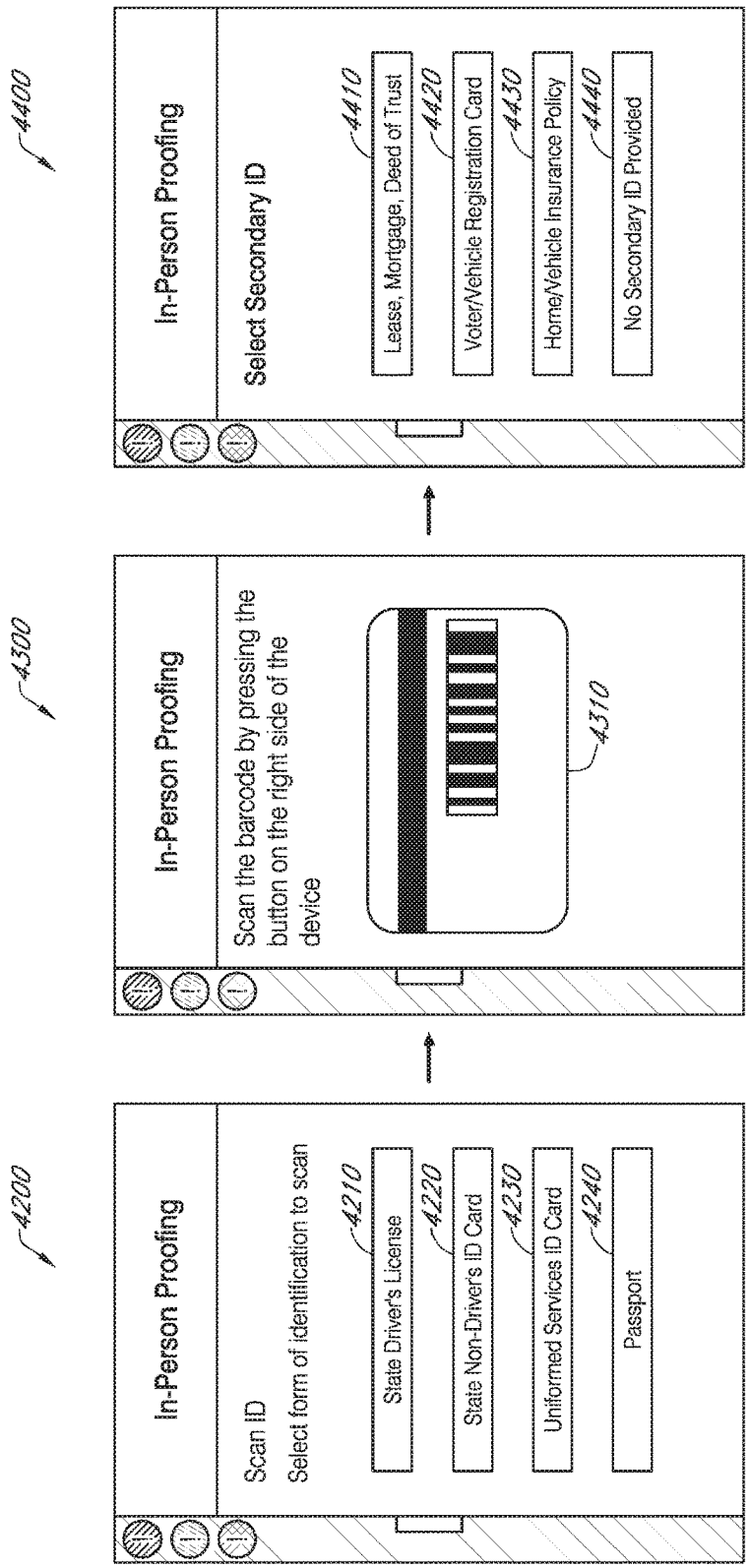

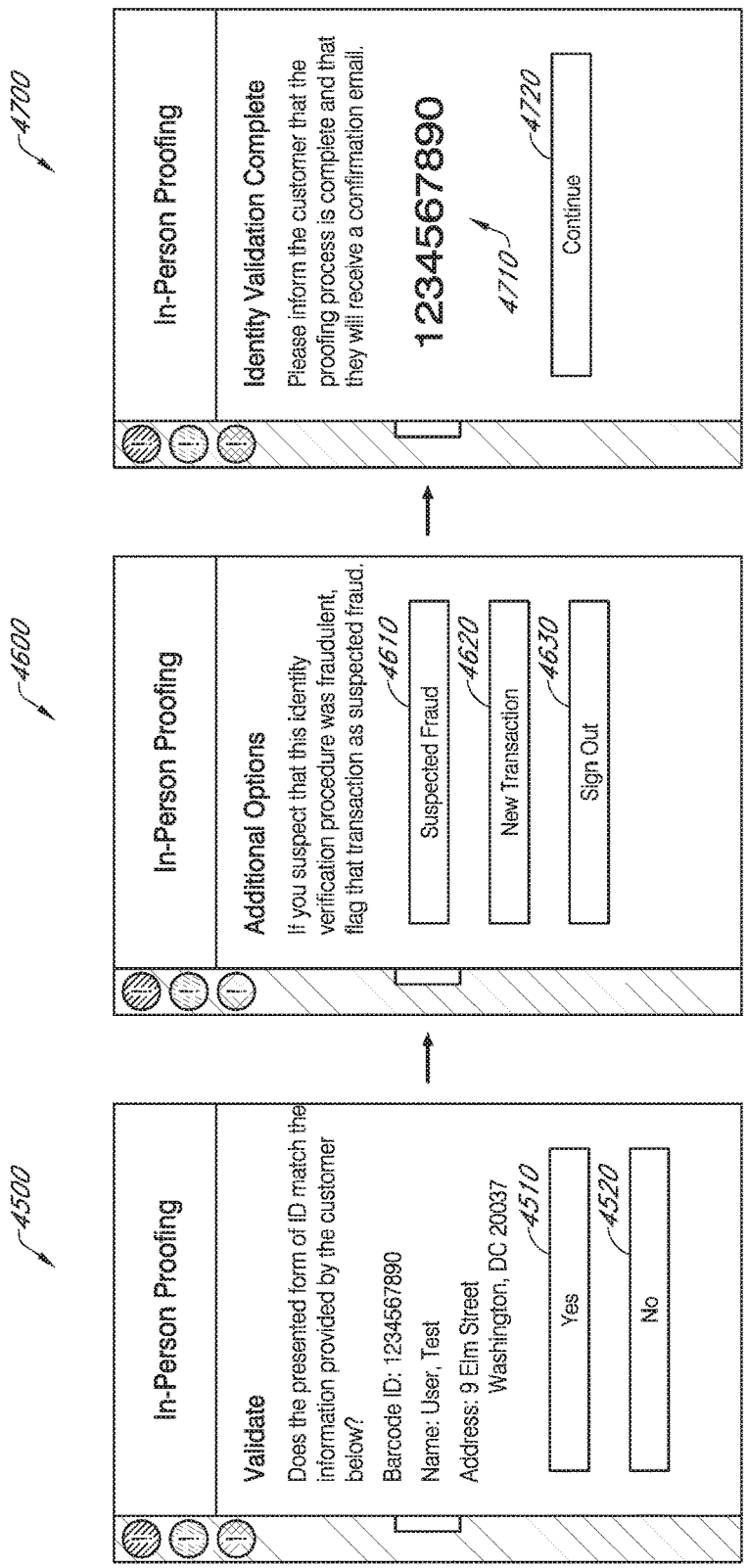

US 10,277,575 B2

SYSTEM AND METHOD OF PROVIDING IDENTITY VERIFICATION SERVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 15/195,885, filed Jun. 28, 2016, and claims the benefit of U.S. Provisional Application No. 62/187,147, filed Jun. 30, 2015, the entire contents of which are both herein incorporated by reference.

BACKGROUND OF THE INVENTION

Field of the Invention

The application is directed to creating a verified digital identity and more particularly to creating a verified digital identity by in-person proofing.

Description of the Related Art

It has been estimated that 75% of business customers in the United States would avoid creating a new account due to password fatigue. The use of certain government services, for example, requires a certain high level of digital authentication to exist. For example, the "My USPS" application requires a verified identity to set up notifications and to start receiving tracking updates for shipped products. In addition, each federal government agency has its own website to use government services and requires a separate digital credential through their own log-in process. Thus there are passwords and digital identification that are needed for each service.

There are market opportunities in ecommerce to allow consumers to securely use emerging marketplace and online retail services while safeguarding payment and shipping information. There are other opportunities in access control to decrease the distribution of sensitive information by centralizing identity information to only share necessary data with appropriate parties. There are market needs for digital and physical identity verification and secure sign-on across government services to increase a move to digital services.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include online registration, identity proofing, credentialing, authentication and identity attribute validation.

Identity verification services can include a third party service integrated with an online application, such as a U.S. Postal Service application, for example, that uses knowledge-based questions to verify a person's identity online. Identity verification services can also include technology solutions that enable in-person verification of an individual's identity at a location of a service business, such as at a U.S. Postal Service retail unit, or by an employee of the business, such as a letter carrier, at a customer's residence or a business location of the customer for the purpose of issuing a digital identity or offered as a service for a third party. Identity verification services further include issuance and management of credentials, such as usernames/passwords, tokens or other authentication mechanisms, with increasing levels of trust to appropriately correspond with the online service or application being accessed. These services allow users to perform online registration, identity proofing, credentialing, authentication and identity attribute validation.

In one aspect, there is a computer assisted method of validating an upgrade of authentication credentials comprising authenticating a first user, via a computing system including a network, the first user associated with a first entity; receiving, from the first user, input identifying a customer name for the online account; receiving, from the first user, input indicating a type of identification to be presented at a validation event for the online account; receiving, from the first user, input indicating a transaction code associated with the validation event; receiving, from the first user, input indicating a first location of the validation event; authenticating a second user, via a computing system including a network, the second user associated with a second entity; providing to the second user a list of validation events for a set of locations including the first location; receiving, from the second user, input selecting a validation event in the list of validation events; presenting, to the second user, one or more of the customer name, the transaction code, and the type of identification associated with the selected validation event; and receiving, from the second user, input indicating a result of the validation event, wherein a credential or token for the first user is created and assigned based on the validation event.

The method may further comprise determining whether the second user is physically located at the first location corresponding with the selected validation event. The method may further comprise digitally signing the result and transmitting the digitally signed result to the first entity and may further comprise digitally signing the customer name, transaction code, and type of identification with the result. The method may further comprise receiving, from the first user, input indicating the first location of the validation event is either a postal facility or a customer address.

The method may further comprise presenting a barcode associated with the selected validation event. The input may indicate a result comprising the barcode.

The method may further comprise presenting, to the first user, one or more attributes of the online account; receiving, from the first user, input indicating at least a partial address; presenting, to the first user, one or more entity locations within a proximity of the partial address; and receiving, from the first user, input selecting one of the one or more entity locations.

The method may further comprise changing a level of assurance to level two. The first entity may comprise a household, an organization or a business. The second entity may comprise a service organization, a service business, or a government agency.

In another aspect, there is a method of validating an upgrade of authentication credentials comprising authenticating a first user, the first user associated with a first entity; receiving, from a first user computing system, input identifying a customer name for the online account; receiving, from the first user computing system, input indicating a transaction code associated with the validation event; receiving, from the first user computing system, input indicating a first location of the validation event; authenticating a second user, the second user associated with a second entity; providing to a second user specialized computing system a list of validation events for a set of locations including the first location; receiving real-time geographic coordinates of the second user computing system; providing a notification to the second user when the second user computing system is within a predetermined distance from the location of each of one or more validation events; receiving, from the second user, input selecting a validation event in the list of validation events; presenting, to the second user, one or more of a name and the transaction code; and receiving, from the second user computing system, input indicating a result of the validation event, wherein a credential or token for the first user is created and assigned based on the validation event.

The method may additionally comprise receiving a current time of day and day of week along with the geographic coordinates; and determining whether the second user is at a location of a second user's assigned route at a time of day corresponding to the day of the week within a predetermined window of time.

The second user computing device may comprise a scanner, a global positioning system circuit, and custom input keys. The method may further comprise determining whether the second user is physically located at the first location corresponding to the selected validation event.

The method may further comprise digitally signing the result and transmitting the digitally signed result to the first entity. The method may further comprise digitally signing the customer name and transaction code with the result.

The method may further comprise presenting a barcode associated with the selected validation event. The input may indicate a result comprising the barcode.

The method may further comprise presenting, to the first user computing system, one or more attributes of the online account; and receiving, from the first user computing system, input indicating at least a partial address.

The method may further comprise receiving, from the first user computing system, input indicating a type of identification to be presented at the validation event for the online account. The method may further comprise changing a level of assurance from level one to level two.

In another aspect, there is a system for validating an upgrade of authentication credentials comprising a networked computing device including one or more processors operably configured to access one or more storages, wherein the one or more processors are operably configured to: authenticate a first user, the first user associated with a first entity; receive, from a first user computing device, input identifying a customer name for the online account; receive, from the first user computing device, input indicating a transaction code associated with the validation event; receive, from the first user computing device, input indicating a first location of the validation event; authenticate a second user, the second user associated with a second entity. A second user specialized computing device includes a global positioning system circuit, a display and one or more processors operably configured to receive a list of validation events for a set of locations including the first location; receive real-time geographic coordinates of the location of the second user; provide a notification to the second user when the second user computing device is within a predetermined distance from a location corresponding to each of one or more validation events; receive, from the second user, input selecting a validation event in the list of validation events; present, to the second user, one or more of a name and the transaction code; and indicate a result of the validation event, wherein a credential or token for the first user is created and assigned based on the validation event.

A successful verification event may be bound to a credential or token for level of assurance two. The result may comprise a confirmation code displayable on the second user's display to the first user and/or sendable with a confirmation message to the first user's computing device.

The credential or token may be tied to a mobile computing device of the first user.

In another aspect, there is a system for validating an upgrade of authentication credentials comprising a set of networked computing devices, each computing device including one or more processors operably configured to access one or more storages, wherein selected computing devices are operable configured to: authenticate a first user via access to a first storage, the first user associated with a first entity; receive, from a first user, input identifying a customer name for the online account; receive, from the first user, input indicating a transaction code associated with the validation event; receive, from the first user, input indicating a first location of the validation event; authenticate a second user via access to a second storage, the second user associated with a second entity; receive a list of validation events for a set of locations including the first location; receive real-time geographic coordinates of the location of the second user; provide a notification to the second user when the second user is within a predetermined distance from a location corresponding to each of one or more validation events; receive, from the second user, input selecting a validation event in the list of validation events; present, to the second user, one or more of a name and the transaction code; and indicate a result of the validation event, wherein a credential or token for the first user is created and assigned based on the validation event.

In yet another aspect, there is a program, executable on a non-transitory programmable device containing instructions, which when executed, validates an upgrade of authentication credentials, and causes the programmable device to authenticate a first user, the first user associated with a first entity; receive, from a first user computing system, input identifying a customer name for the online account; receive, from the first user computing system, input indicating a transaction code associated with the validation event; receive from the first user computing system, input indicating a first location of the validation event; authenticate a second user, the second user associated with a second entity; provide to a second user specialized computing system a list of validation events for a set of locations including the first location; receive real-time geographic coordinates of the second user computing system; provide a notification to the second user when the second user computing system is within a predetermined distance from the location of each of one or more validation events; receive, from the second user computing system, an input selecting a validation event in the list of validation events; present, to the second user computing system, one or more of a name and the transaction code; and receive, from the second user computing system, an input indicating a result of the validation event, wherein a credential or token for the first user is created and assigned based on the validation event.

BRIEF DESCRIPTION OF THE DRAWINGS

FIG. 4, comprising

FIG. 5, comprising

FIG. 9 is an example screen display when a customer is ready to sign into their account or desires to create a business, e.g., USPS, account.

FIG. 10 is an example screen display when a customer verifies their account.

FIG. 11 is an example screen display of exemplary verification questions generated by a knowledge base supplier such as a financial service provider.

FIG. 12 is an example screen display illustrating a customer's preferences summary including an authentication level and a way to upgrade that level.

FIGS. 16A-16B, is an example screen display illustrating a screen showing when in-person proofing has been selected to verify the customer's identity.

FIGS. 17A-17B, is an example screen display of an email having a barcode sent to the customer when in-person proofing has been selected.

FIG. 18 is an example screen display such as shown on a mobile point of sale (mPOS) device as used by a postal worker to verify the customer's identity in person at a USPS location.

FIG. 19 is an example screen display such as shown on the mPOS device to scan the barcode from the email previously sent to the customer.

FIG. 21 is an example screen display requesting one or more of certain forms of identification using the mPOS device.

FIG. 24 is an example screen display requesting a selection of a second form of identification using the mPOS device, such as when the first form of identification does not have an address or has an outdated address.

FIG. 25 is an example screen display requesting to validate the presented form(s) of identification against the information previously provided by the customer.

FIG. 27 is an example screen display illustrative of completing the proofing and presenting a validation proofing confirmation code using the mPOS device.

FIG. 30 is an example screen display illustrative of a mismatch in a prior step and of options for a secondary form of identification having a current address of the customer.

FIG. 39 is an example screen display with a choice of barcode scan or barcode identifier entry selection of a customer's barcode previously obtained from the USPS such as shown on the MDD system.

FIG. 40 is an example screen display of in-person proofing illustrative of scanning the customer's barcode such as shown on the MDD system.

FIG. 41 is an example screen display of in-person proofing illustrating instructions for the carrier to request a current primary and/or secondary form of identification such as shown on the MDD system.

FIG. 42 is an example screen display of in-person proofing requesting a selection of a primary form of identification to be scanned such as shown on the MDD system.

FIG. 43 is an example screen display of in-person proofing illustrative of scanning the selected form of identification such as shown on the MDD system.

FIG. 44 is an example screen display of in-person proofing requesting a selection of a secondary form of identification to be viewed if provided such as shown on the MDD system.

FIG. 45 is an example screen display of in-person proofing requesting validation of the presented form of identification against the customer information previously presented such as shown on the MDD system.

FIG. 46 is an example screen display of in-person proofing illustrative of additional options such as a way of using the MDD system to indicate suspected fraud in the verification procedure.

FIG. 47 is an example screen display of in-person proofing illustrating that the validation is complete and a validation email is being sent to the customer such as shown on the MDD system.

DETAILED DESCRIPTION OF CERTAIN EMBODIMENTS

Figure 1:
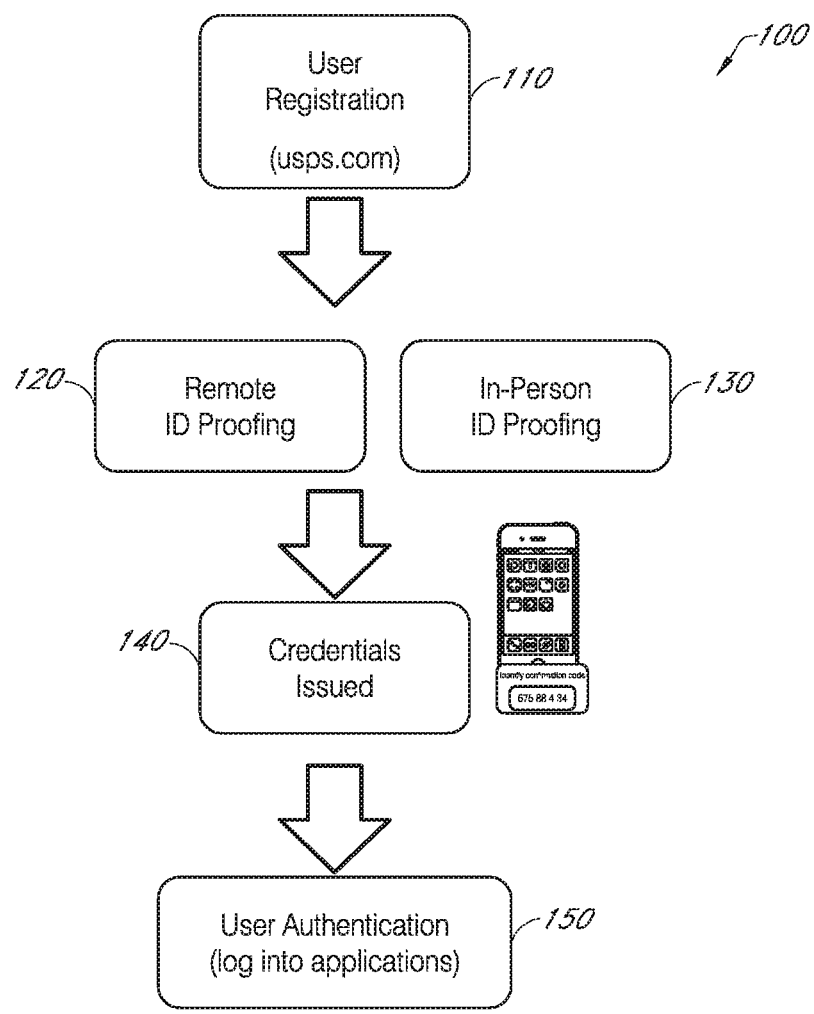
FIG. 1 is a flow diagram of an example high level process to verify customer identity.

The following detailed description is directed to certain specific embodiments of the invention. However, the invention can be embodied in a multitude of different ways as defined and covered by the claims. In this description, reference is made to the drawings wherein like parts are designated with like numerals throughout.

At a high level, internal digital identity services accomplish their function in several steps. First, a consumer can access an online application to initiate a verified digital identity. The consumer's identity can be verified online, or by visiting a service business location or at their residence by an employee of the business. If certain criteria are met, a verified digital identity is issued with a higher level of assurance. Consumers can use their verified credential for login to various services, including government services and commercial sites. This improves the privacy and security for users.

For the purposes of this discussion, the U.S. Postal Service (USPS) will be referred to as the service business as an example only. Other entities could perform this role. Thus, a consumer can access an online application such as a USPS application to initiate a process to obtain a verified digital identity. The consumer's identity can be verified online, or by visiting a post office or at their residence by their letter carrier. If certain criteria are met, a USPS verified digital identity is issued with a higher level of assurance. Consumers can use their verified USPS application credential for login to USPS services, government services and commercial sites.

The National Institute of Standards and Technology (NIST) special publications (SP) 800-63 Electronic Authentication Guideline establishes technical guidelines for implementing authentication mechanisms for government and electronic commerce. While these recommendations are specifically for the United States, they are broadly applicable to any environment that requires the authentication of entities and users. These recommendations define the technical requirements for the four levels of assurance (LoA) in the areas of identity, proofing, registration, tokens, authentication protocols and related assertions. The NIST regulation complements the Office of Management and Budget (OMB) Guidelines "E-Authentication Guidance for Federal Agencies", which also define four LoA for electronic communications. These four levels of authentication, Levels 1 to 4, are defined in terms of the consequences of the authentication errors and misuse of credentials. Level 1 is the lowest assurance and Level 4 is the highest. The OMB guidance defines the required level of authentication assurance in terms of the likely consequences of an authentication error. As the consequences of an authentication error become more serious, the required level of assurance increases. The international standard ISO/IEC 29115 (Entity Authentication Assurance Framework) provides a framework for managing user authentication guarantees. It establishes four LoA for entities, stipulating the criteria and guidelines for each of the defined levels.

The four levels of assurance are briefly described as follows. Although there is no identity proofing requirement at Level 1, the authentication mechanism provides some assurance that the same user who participated in previous transactions is accessing the protected transaction or data. Level 2 provides single factor authentication. At Level 2, identity proofing requirements are introduced, requiring presentation of identifying materials or information. Level 3 provides multi-factor authentication. At least two authentication factors are required. At this level, identity proofing procedures require verification of identifying materials and information. Level 4 is intended to provide the highest practical authentication assurance. Level 4 authentication is based on proof of possession of a key through a cryptographic protocol. At this level, in-person identity proofing is required.

The USPS can also provide in-person identity verification and biometric capture services to other government agencies or companies as a component service. At a high level, external digital identity services include several steps. First, a consumer can register with an agency or commercial company. The agency or company needs in-person identity verification and/or biometric capture and therefore sends the user to the USPS. The user visits a nearby Post Office or schedules an appointment with a letter carrier. The user's identification is verified against information provided by the requesting party, and at select sites biometrics are captured. The information obtained is securely transferred to the requesting party so as to complete the transaction. Thus the USPS can be a national enabler of verified digital identities and a convenient biometric capture partner.

FIG. 1 is a diagram of an example high level process 100 to verify customer identity. An enhanced identity process, such as the exemplary USPS process, which can be performed via a website such as a USPS website, verifies the customer identity to a higher level of assurance (e.g., binding a digital identity to a physical address, phone and email). Beginning at a step 110, a user registration is performed at a website USPS, for example. Proceeding to step 120 or step 130, two ways of performing identity proofing will be described. At step 120, remote identity (ID) proofing is performed. Remote identity proofing is primarily conducted remotely via knowledge based out of wallet questions. Remote identity proofing will be further described herein below. Alternatively at step 130, in-person ID proofing is performed. In-person proofing can be performed at local business locations such as via USPS personnel at a local Post Office with a retail clerk or via a mail carrier on their route by validating that a photo ID of a customer matches what the user entered during registration. In-person proofing will be further described herein below. Proceeding to step 140, a credentialing process is performed. After a successful identity proofing, a credential in the form of a user name and password combination is created and assigned. Credentialing may also involve tying the credential to a mobile device and may include biometric login such as a fingerprint or voiceprint. After completion of the credentialing, process 100 proceeds to an authentication step 150. Once the user has an activated credential, the user can log into an application using the credential to identify themself.

Figure 2:
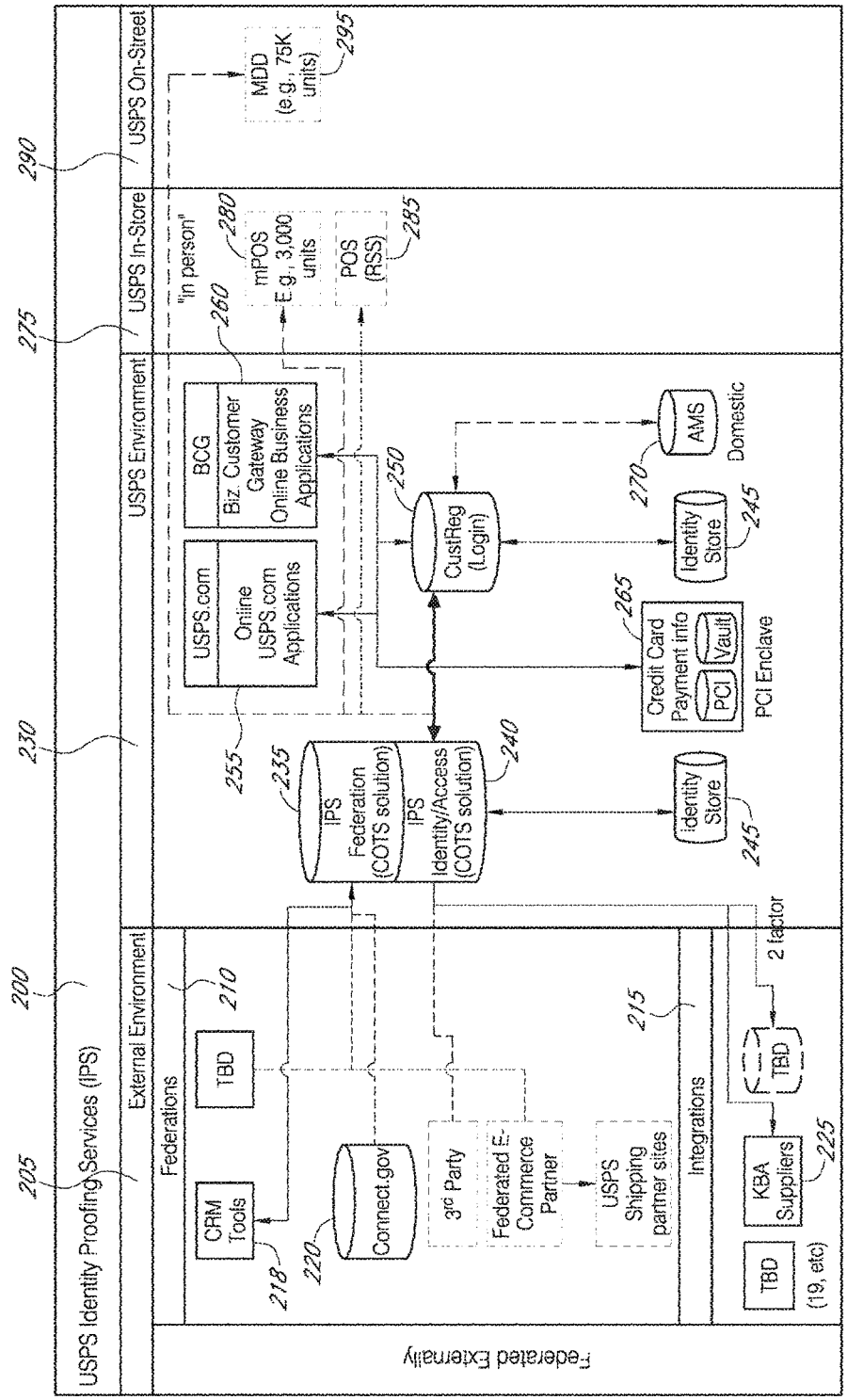
FIG. 2 is a block diagram of an example relational configuration of elements of a system to conduct the process illustrated in FIG. 1.

FIG. 2 is a block diagram of an example relational configuration 200 of portions of a system to conduct the process 100 illustrated in FIG. 1. The configuration 200 includes an external environment 205, a service environment 230, such as available through the USPS, an in-store environment 275, such as available through the USPS, and an on-street environment 290, such as available through the USPS. The external environment 205 includes a federations section 210 and an integrations section 215. The federations section 210 includes customer relations management (CRM) tools 218 and a service platform 220 such as connect.gov entity. In certain embodiments, connect.gov is a service platform that enables individuals to utilize a user name and password to digitally access online across multiple government agency websites. The integration portion 215 includes Knowledge Based Authentication (KBA) suppliers 225. A KBA supplier can be used to score a customer's answers to a set of questions, for example such as shown in FIG. 11. The knowledge based authentication suppliers are connected to an Identity and Proofing Service (IPS) identity/access COTS solution 240 such as used in the USPS environment. In certain embodiments, the IPS identity/access portion 240 is a commercial off-the-shelf (COTS) software package that can be modified with custom programming or scripts. The IPS identity/access portion 240 provides identity and access control management functions, which can include full life cycle functions around registration, credentialing, authentication, provisioning, reporting and directory services.

The IPS identity/access portion 240 works in combination with an IPS federation portion 235, which is also a commercial off-the-shelf solution. The IPS federation portion 235 provides cross domain login through credential tokenization according to industry protocols, such as Security Assertion Markup Language (SAML) or OpenID Connect. Identity federation describes use-cases, standards and technologies for enabling the propagation of identity information across different security domains. For promoting federation among enterprises, SAML is an XML-based standard developed by the Organization for the Advancement of Structured Information Standards (OASIS) Security Services Technical Committee for exchanging authentication and authorization data between security realms, so it can be used to support identity federation. The IPS federation portion 235 can be connected with the service platform 220 such as the connect.gov application.

The IPS identity/access portion 240 is also connected to an identity storage 245 and a customer registration (CustReg) login portion 250. The CustReg portion 250 is further connected to an online application 255, such as the USPS application, which can include multiple online applications and to a business customer gateway portion 260 of customer gateway online business applications. The applications 255 and 260 are connected with a payment card industry (PCI) enclave 265 that has credit card payment information including PCI information and a vault. The customer registration portion 250 further connects to an address management system (AMS) 270, which in certain embodiments is the United States Postal Service master database of deliverable addresses.

In certain embodiments, the IPS identity/access portion 240 connects to one of a point of sale (POS) next generation retail system 285 or to a mobile point of sale (mPOS) system 280. The mPOS system 280 and POS retail system 285 can be utilized by business employees in person in the in-person portion 275. In certain embodiments, the mPOS system 280 includes a handheld computing device such as an Apple iPod Touch, a portable receipt printer and a postage printer. See FIG. 7 for an illustration of one embodiment of the mPOS system 280. The mPOS system 280 can include a scanning feature and further includes a processor, memory, a display, and a custom program that makes the device a specialized machine. In another embodiment, the IPS identity/access portion 240 connects with a mobile delivery device (MDD) system 295 in an on-street portion 290. The MDD 295 can include various features including a scanning subsystem, a display portion, a battery charging portion, a processor, a memory, various key inputs, such as a keyboard and a keypad, and a specialized global positioning system (GPS) receiver. In certain embodiments, when the MDD 295 is not being used, it can reside on a cradle (not shown) for charging and to transfer data to and from the memory. In certain embodiments, the data transfer takes place during a time of day when the device is not used by a business employee (e.g., mail carrier), such as between 1 AM and 5 AM for example. An embodiment of the MDD 295 is shown in FIG. 8, which will be discussed at a later point herein.

Figure 3:
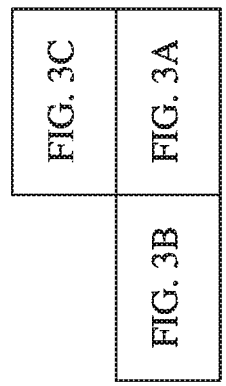
FIG. 3, comprising
Figure 3A:
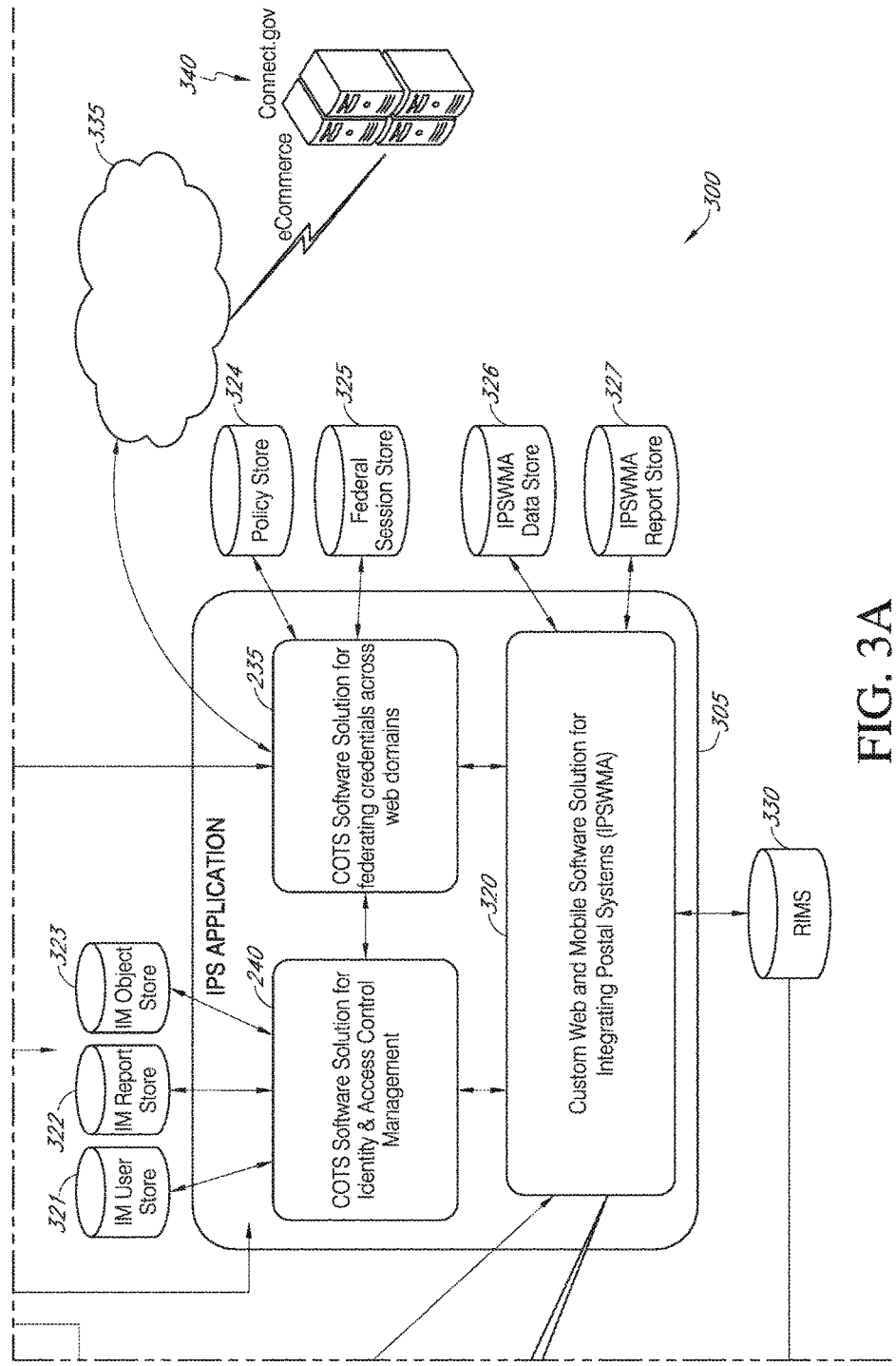
FIGS. 3A-3C, is a block diagram of an example physical architecture of elements of a system to conduct the process illustrated in FIG. 1.
Figure 3B:
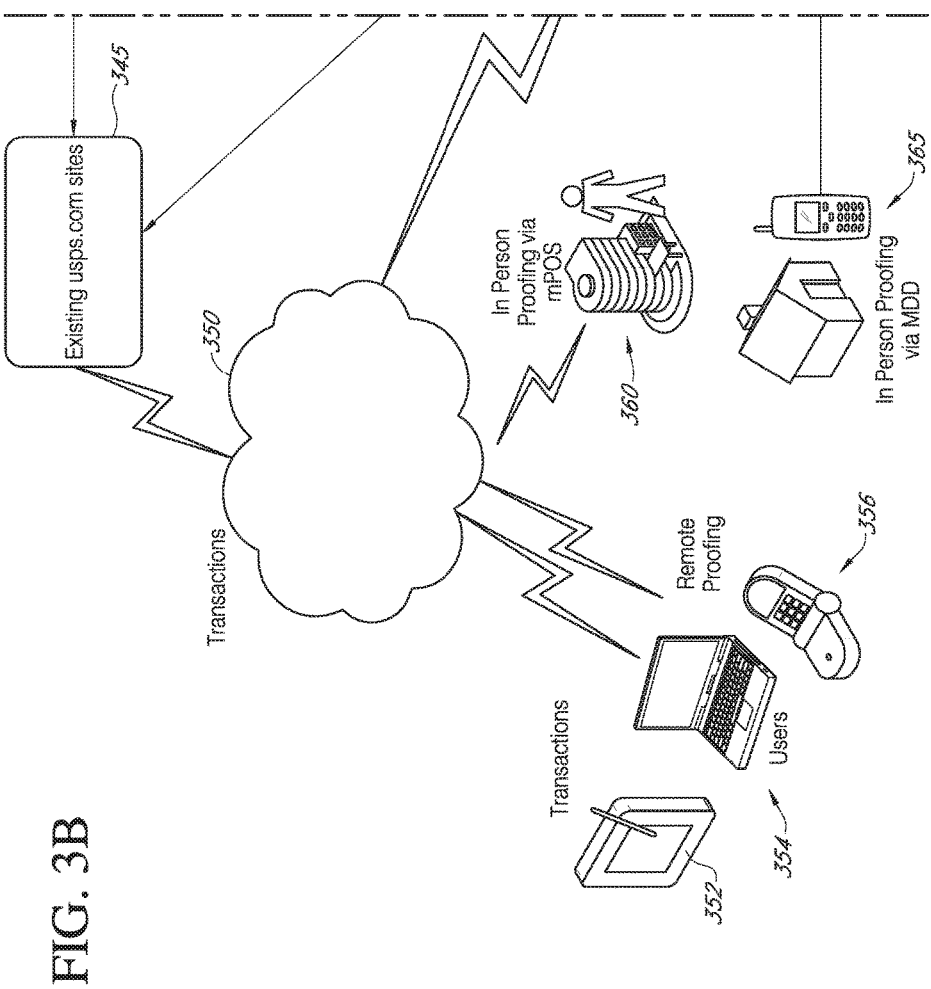
Figure 3C:
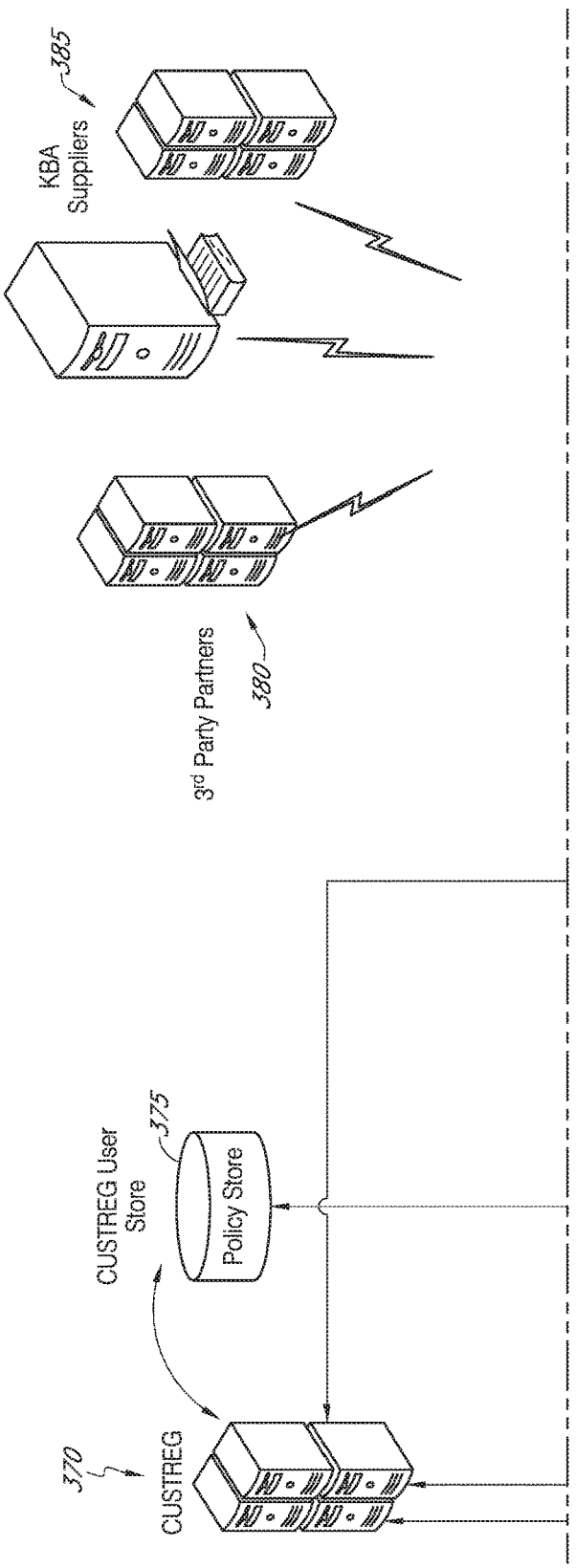

FIGS. 3a, 3b and 3c are block diagrams of an example physical architecture (300) of portions of a system to conduct the process illustrated in FIG. 1. In certain embodiments, the servers used for identity verification are specialized with custom software developed for the service business (e.g., USPS). For example, an identity verification application can require development of additional software to execute on the servers. Architecture 300 includes an identity proofing services (IPS) application 305. In certain embodiments the IPS application 305 performs its functions and executes upon a server, such as a web based regional intelligent mail server (RIMS) 330. The IPS application 305 can be a collection of individual software components architected to integrate with existing systems of the service business to provide identity verification services through the online and retail network of the service business (e.g., USPS). The IPS application 305 can include the commercial off-the-shelf software solution 235 for federating credentials across web domains so the credentials can be utilized and accepted at many domains. The IPS application 305 can also include the commercial off-the-shelf software solution 240 for identity and access management access control management 240. These two portions communicate with each other and both communicate with a custom web and mobile software solution 320 for integrating systems. In certain embodiments, the identity and access control portion 240 communicates with several databases such as an identity management (IM) user storage 321, an identity management report storage 322, and an identity management object storage 323.

The web and mobile software solution for integrating systems 320 can be a customized application to interact between the commercially available software applications 235 and 240 in order to apply business-specific (e.g., USPS) business logic and user flow to the customized web presentation layer. The IM user storage 321 includes additional account identity attributes used in elevating a personal account from a National Institute of Standards and Technology (NIST) level of assurance one (LOA1) self-asserted registration to a NIST LOA2. The identity management report storage 322 is a database where the Report server (Business Objects) stores its own data. The identity management object storage 323 is a user account information database.

The federating credentials portion 235 is in communication with several databases such as a policy storage 324 and a federal session store 325. The policy storage 324 is a business logic and process flow database. The federal session store 325 is a cross domain log database. The custom web and mobile software solution 305 is in communication with several data bases such as a data store 326 and a report storage 327. The data store 326 is a web application server database. The report storage 327 is a web application reporting database. In certain embodiments, the IPS application 305 communicates with a network 335, such as the Internet. Through use of the network 335, a set of servers 340 are used to perform the service platform application, such as connect.gov, for ecommerce. Also in communication with the global network 335 are third party partners having servers 380 and knowledge based authentication suppliers operating on servers 385 such as shown on FIG. 3c.

As shown in FIG. 3c, a customer registration application (CustReg) 370 communicates with the IPS application 305. The customer registration application 370 communicates with a customer registration user storage 375 which also stores policies. The user store 375 is in communication with the IPS application 305. The CustReg servers 370 are also in communication with the IPS application 305. In addition, the CustReg servers 370 are further in communication with existing online application sites 345 (e.g., USPS) such as shown in FIG. 3b. The existing online application sites 345 are also in communication with the IPS application 305. The existing application sites 345 further communicate with a network 350 such as the Internet. The online application transactions communicated via the network 350 are in further communication with the IPS application 305. These online application transactions can include performing remote proofing such as using a tablet 352, a laptop or other portable computing system 354 or via a smartphone 356. The in-person proofing via a mobile point of sale device 360 is also in communication via the network 350. The in-person proofing with a service business employee (e.g., mail carrier) is performed via a mobile delivery device 365 which is in communication with the RIMS server 330. In other embodiments other configuration of the components, servers, databases, and applications can be done.

Figure 4A:
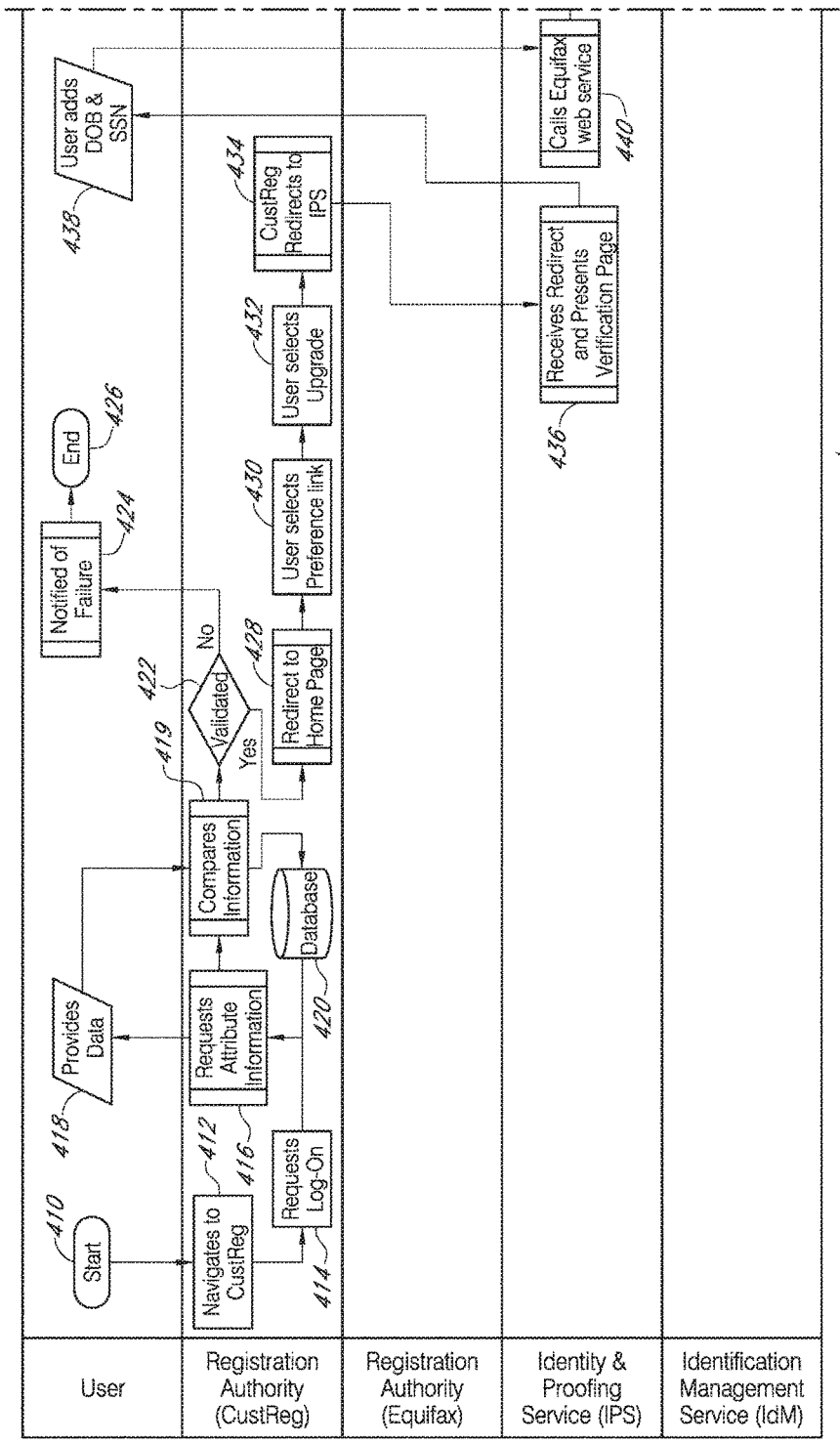
FIGS. 4A-4C, is a flow diagram of an example flow for a remote proofing identification process such as identified in FIG. 1.
Figure 4B:
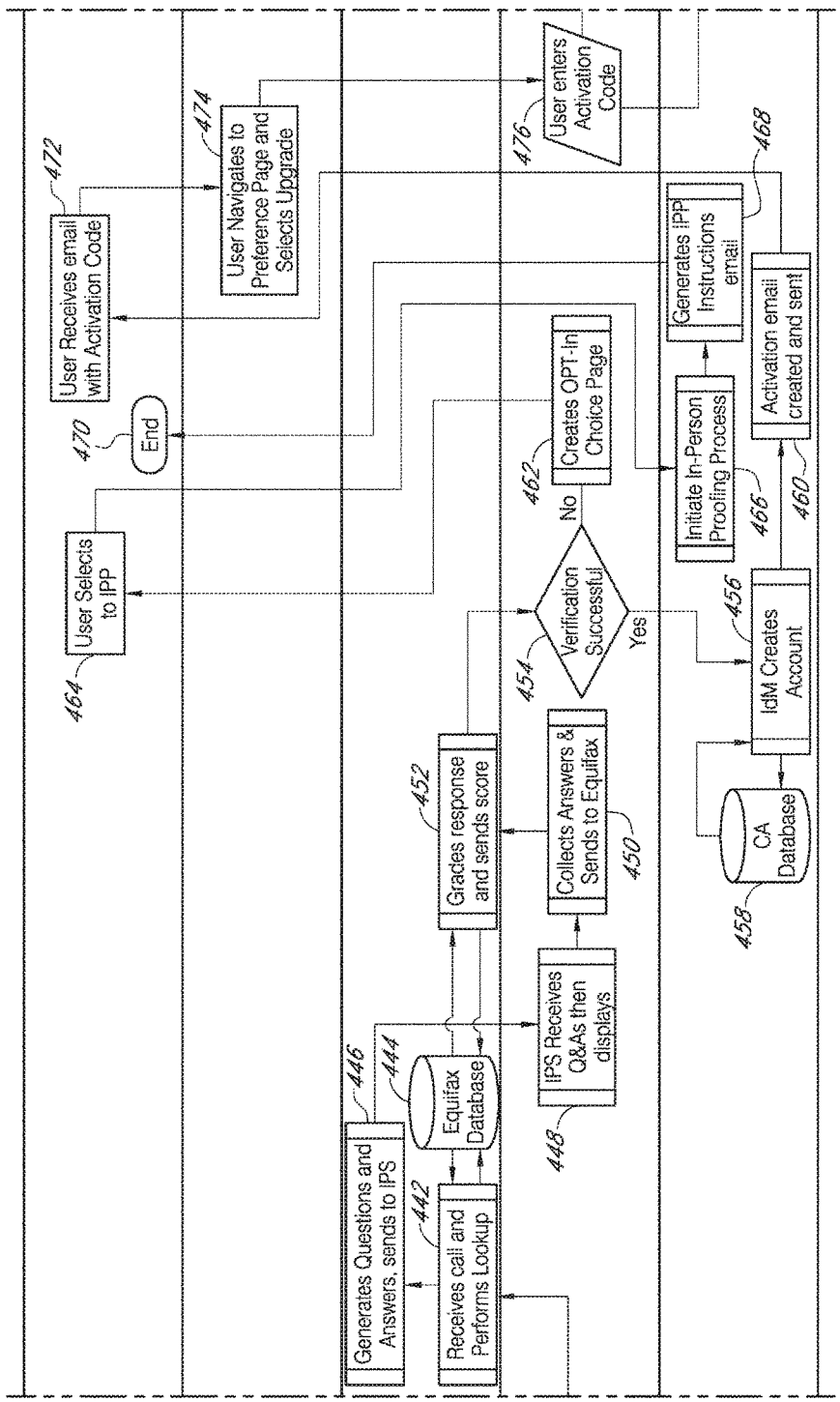
Figure 4C:
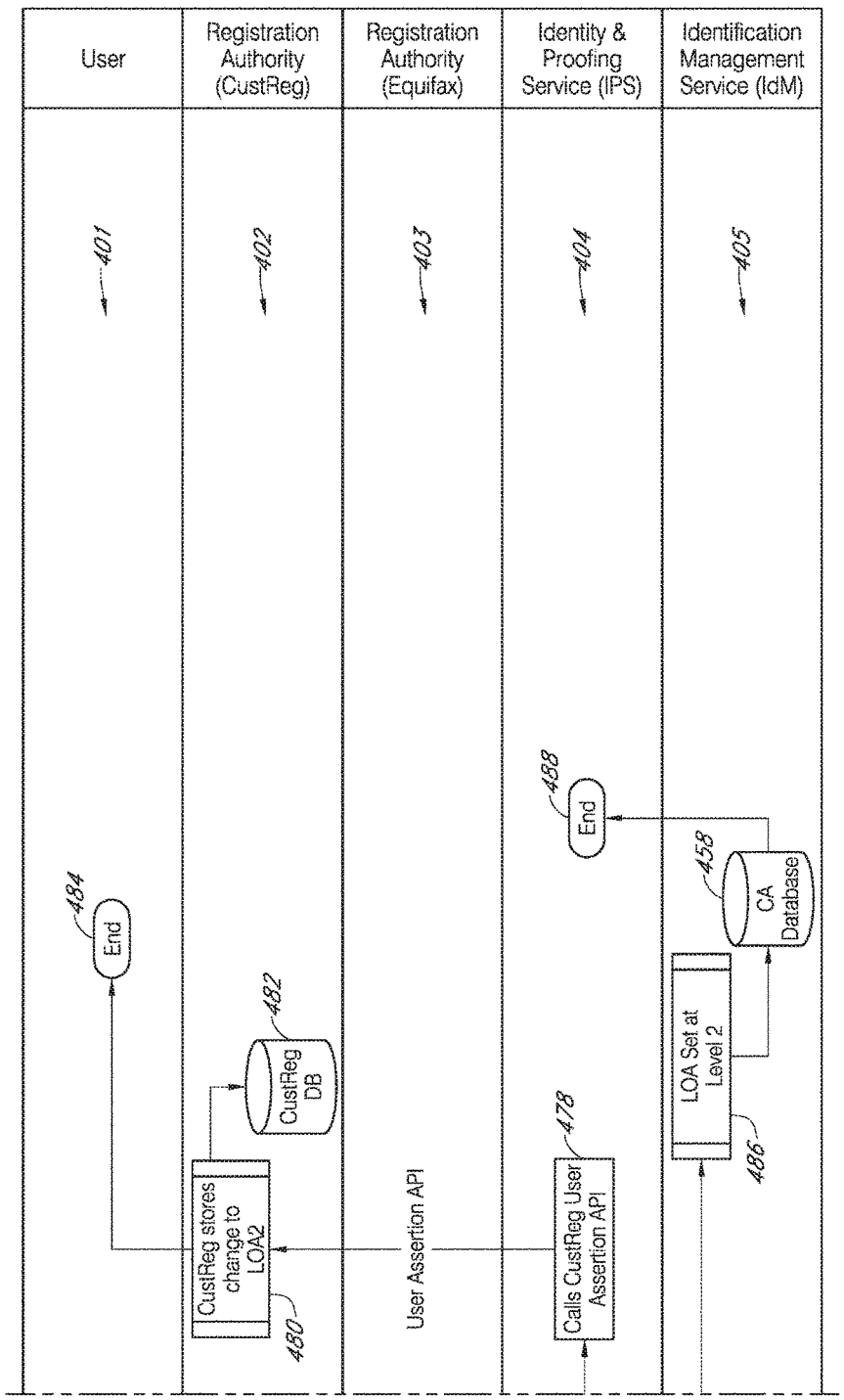
Figure 5A:
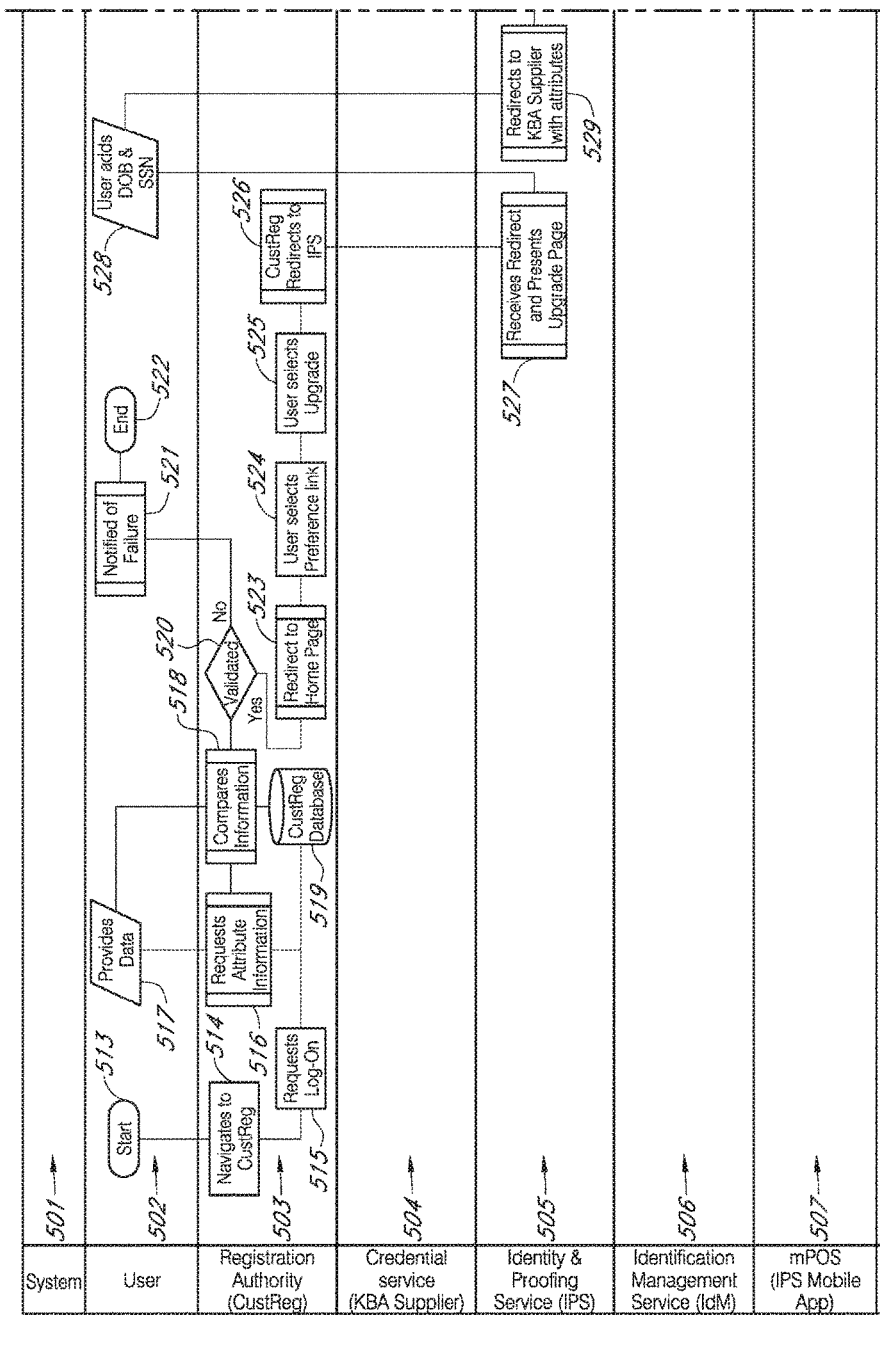
FIGS. 5A-5F, is a flow diagram of an example flow for an in-person proofing identification process such as identified in FIG. 1.
Figure 5B:
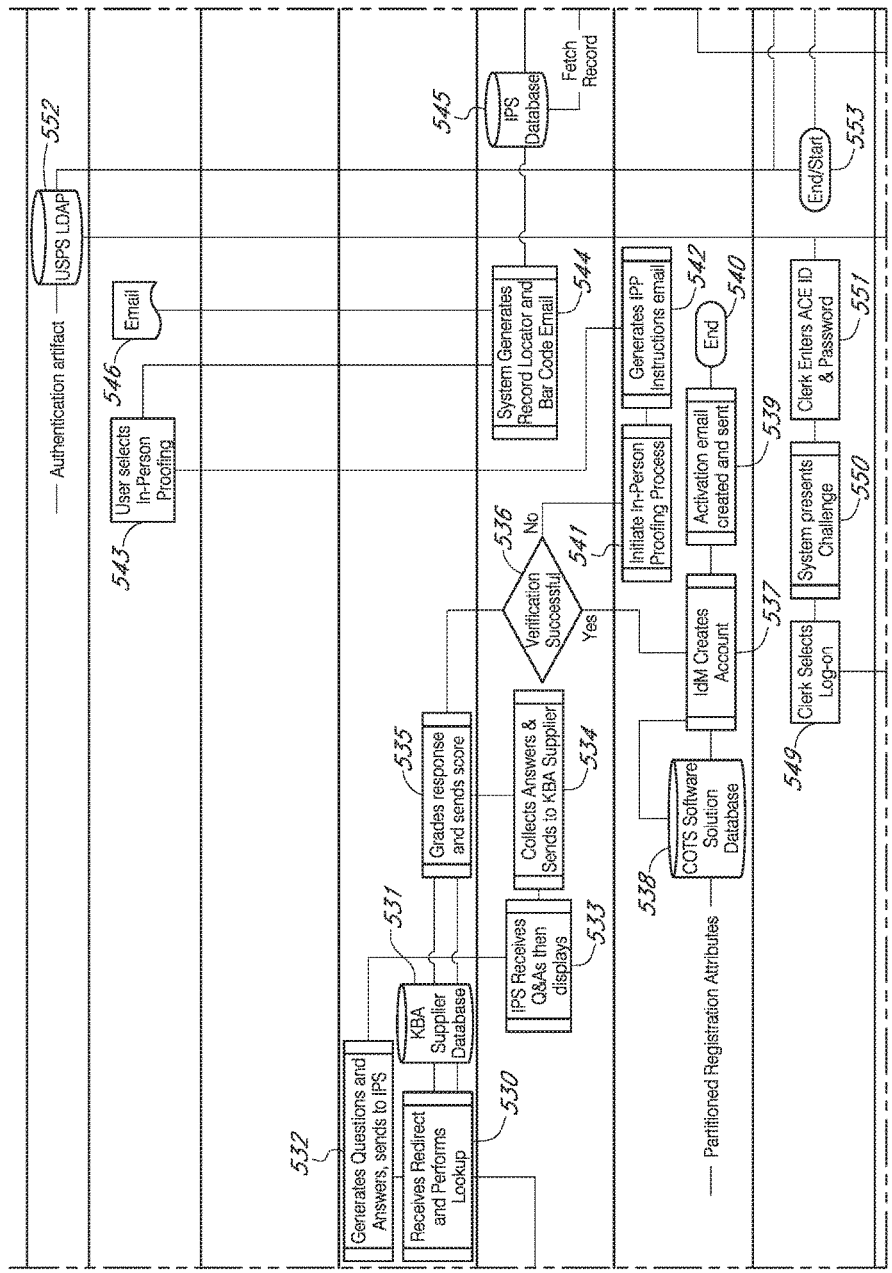
Figure 5C:
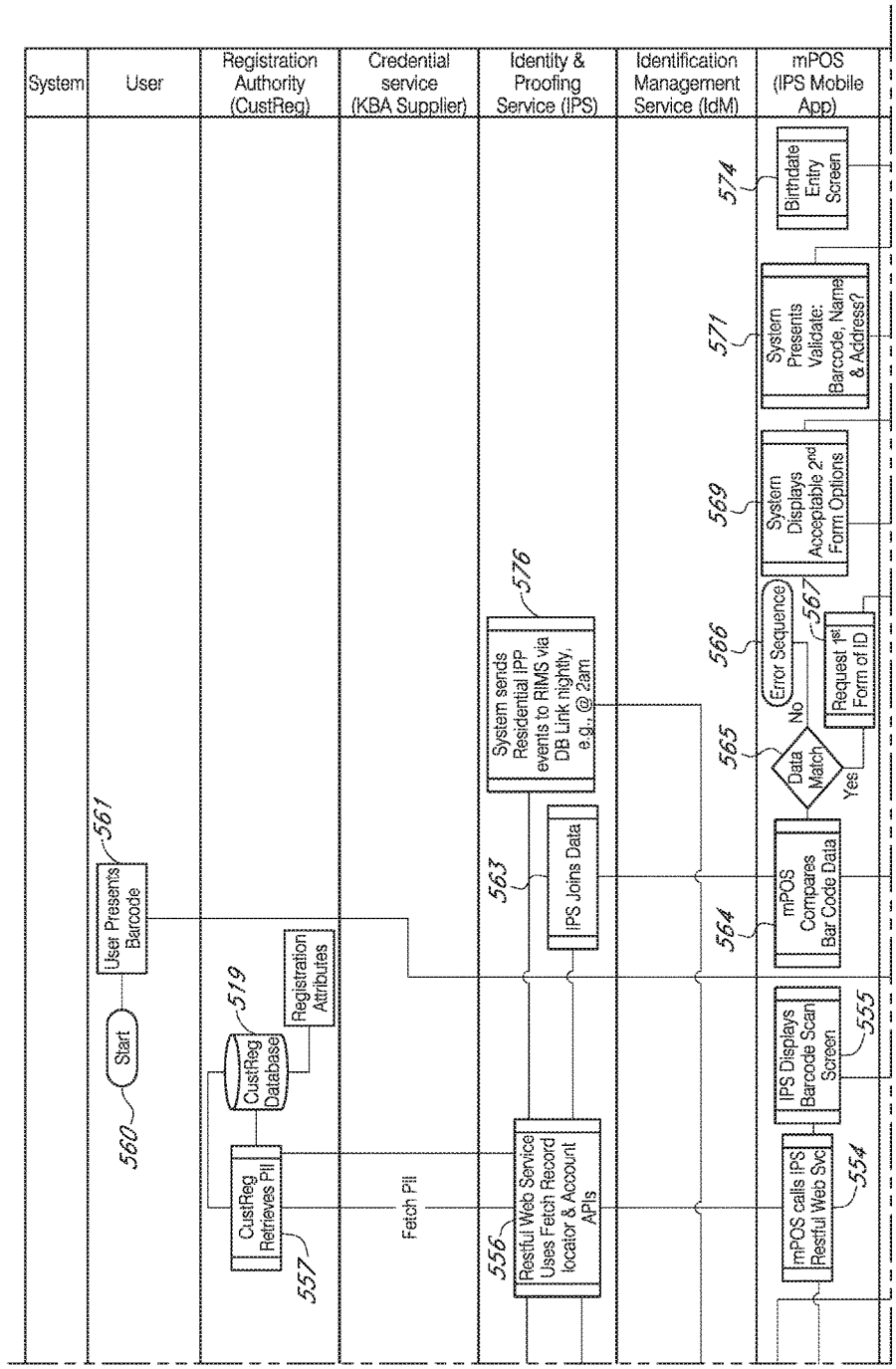
Figure 5D:
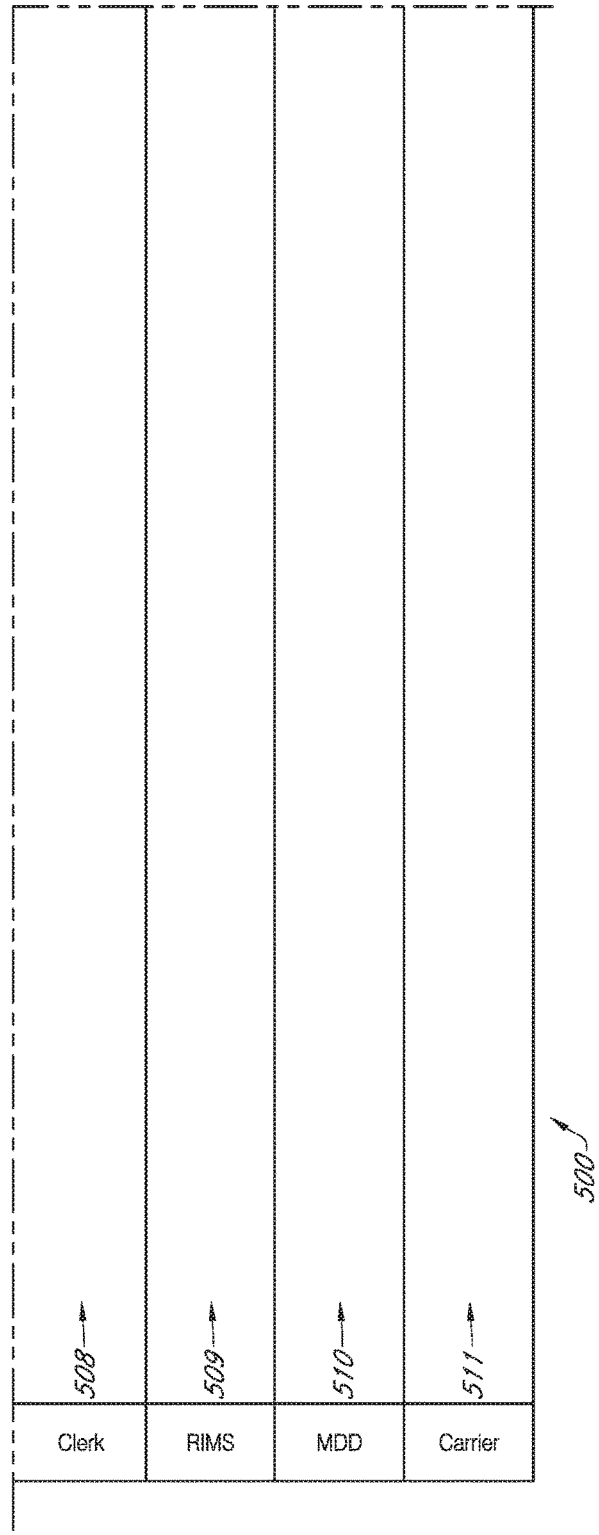
Figure 5E:
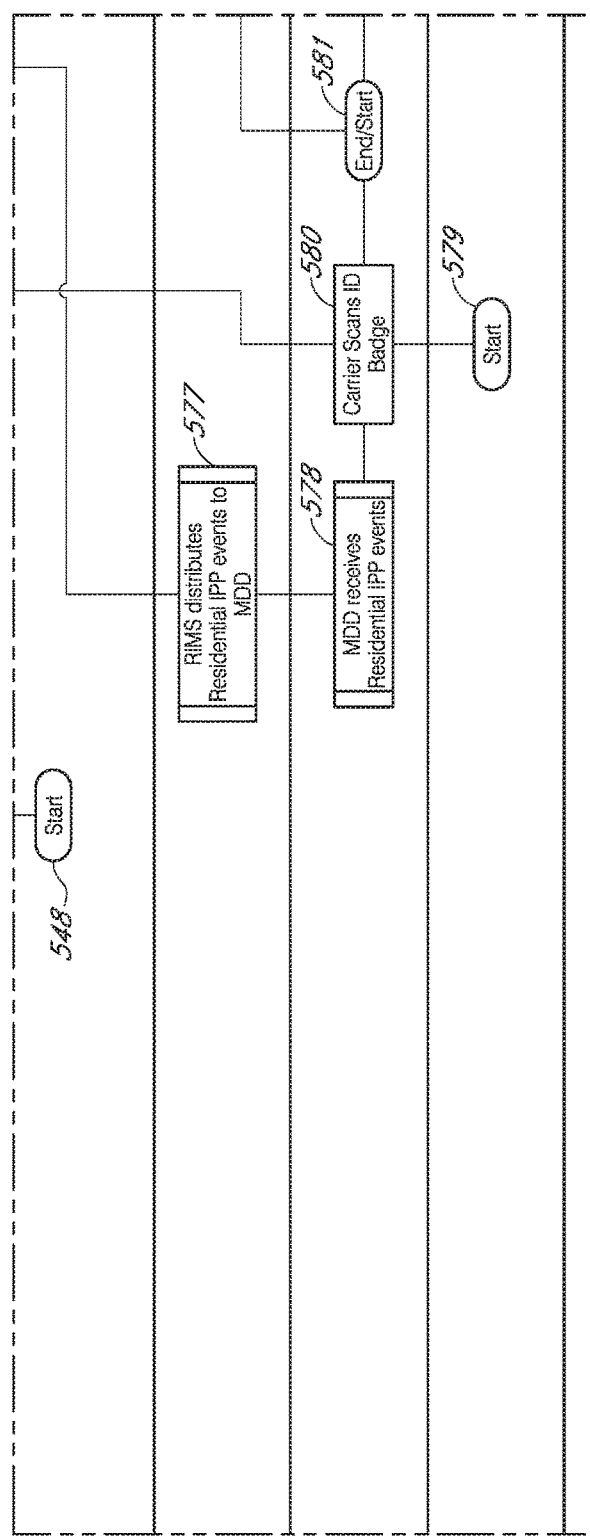
Figure 5F:
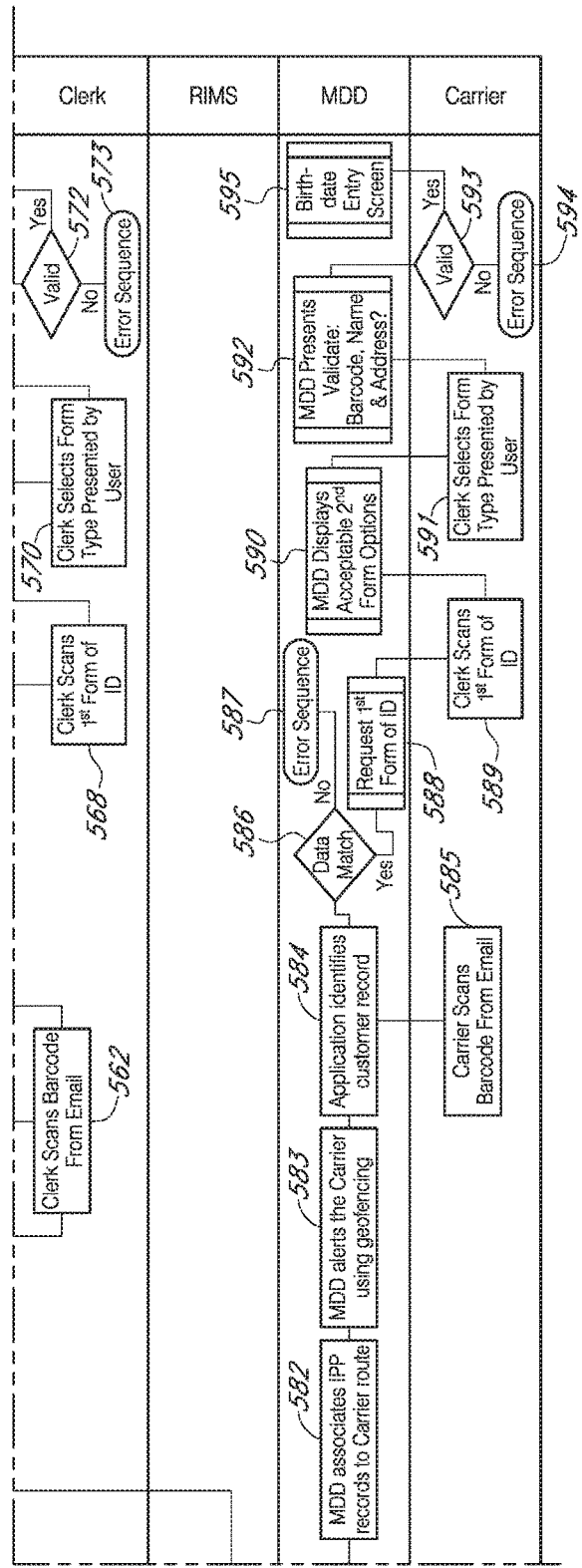

FIGS. 4a-4c are flow diagrams of an example flow for a remote proofing identification process 400 such as identified in FIG. 1. The process 400 includes several entities performing various aspects of the process. These entities include a user 401, a registration authority, which in some embodiments is the CustReg application 402, a registration authority, which in certain embodiments is an Equifax service 403, an identity and proofing service (IPS) 404, and an identification management service (IdM) 405 for identity management. The entities are each associated with one or more processors such as shown by the system configuration 200 and/or system architecture 300.

Beginning at a start step 410, process 400 proceeds to a step 412 and navigates to a customer registration function 412. Proceeding to a step 414, system 200/300 requests a logon to be performed by the user. If the user has not previously registered with the online application, the user is requested to register which includes performing a logon. The information required can vary depending on the level of authentication required of the application being accessed. In the case of creating a basic level business account, such as for the USPS application, the user is required to provide a First Name, Last Name, Current Address, Password, Security Question, email address, and a phone number. For a LOA2 level credential, the registration process would require additional information such as a social security number (SSN) and a date-of-birth. In certain embodiments, logging on is indicative of the customer having at least a LoA of Level 1. NIST defines LOA1 as an authentication with little or unverified information. Essentially, a LOA1 identifies that this logon corresponds to a returning user/account. Information entered by a user is stored at a database 420 and process 400 continues to a function 416 that requests attribute information, such as identified above. The user provides attribute data at a step 418. Proceeding to step 419, the process 400 compares the information received from the user to what was requested of the user at function 416 and updates a CustReg database 420. Proceeding to a decision step 422, process 400 determines if the logon information is valid. In certain embodiments, the encrypted hash of the current login information is compared to the information submitted for authentication. If the logon information is determined not to be valid, process 400 proceeds to a step 424 where the user is notified of a logon failure at a function 424 and process 400 ends at an end step 426. However, if process 400 determines that the logon information is valid as determined at decision step 422, process 400 proceeds to function 428 and redirects the browser to a home page. Moving to a step 430, the user selects a preference link to move to a page where the user can select to upgrade their identity credentials at a step 432.

Proceeding to a function 434, system 200/300 uses the registration authority to redirect to the identity and proofing service. At a function 436, the identity and proofing service receives the redirect and presents a verification page for the user. Proceeding to step 438, the user adds their date of birth and social security number in certain embodiments. In certain embodiments, a governmental account, e.g., a SSN, or a financial account is needed. For security purposes, certain information such as the date of birth and/or social security number is collected by an Identity Verification System (IVS). In certain embodiments, the IVS is an application, such as utilized by the USPS, to verify personal identity attributes of customers doing business with a corresponding entity. For example, this application can be a combination of commercial off-the-shelf software, third-party services providers, and customized software. It works in combination with an enterprise customer registration application to align the proper authentication process to the registration and provisioning process for external customers. In the current application, the SSN is not stored. It is only held long enough to verify against a third party service. That being stated, the collection of the SSN and the date of birth occur in the IVS system which is separated from the customer registration system to provide additional security through distributed information repositories. In summary, in certain embodiments, certain information collected during the process 400, e.g., SSN, may be purged for customer security once the proofing process is complete.

Process 400 continues at a function 440 where a call is made to a registration authority, which can be for example, an Equifax server. In certain embodiments the registration authority is a knowledge-based authentication provider. Proceeding to a function 422 system 200/300 receives a call from the identity and proofing service and performs a lookup for the particular user. In some embodiments this lookup can be performed on an Equifax, or other similar database 444. In certain embodiments, the registration authority generates the questions to be asked of the user and the service business does not keep either the information used to create the questions or the user's answers. The questions are generated at a function 446 along with answers, and both the questions and the answers are sent to the identity and proofing service. At a function 448, system 200/300 receives the questions and answers, and then displays them to the user. In certain embodiments, questions such as those shown in FIG. 11 can be used. These questions are just a sample of potential questions that can be used. Proceeding to a step 450, the identity and proofing service collects the answers from the user and sends the answers to the registration authority. At a function 452, the response from the user is graded via a lookup of the information on the registration authority's database 444 and the score is sent to the identity and proofing service. The response can be graded according to a configurable risk model that adjusts for changing fraud detection methods and generally follows industry best practices. The risk model can include accuracy and completeness of submitted attributes, frequency and recency of prior requests associated with the attribute bundle, industry reports of known fraud associated with attribute bundles, and accuracy of responses submitted to knowledge based authentication questions.

Moving to a decision step 454 the identity and proofing service determines if there is a successful verification based on the score from the registration authority. The threshold is configurable and adjusted according to multiple factors that take into consideration risks associated with application being accessed, ease of use, and evolving fraud deterrence techniques. If the verification is successful, process 400 proceeds to a function 456 where the identification management service creates an account. The information related to the account for the user is stored in a certificate authority (CA) database 458. Process 400 then proceeds to a function 460 where an activation email, SMS or the like is created and sent by the identity management service to the user. This activation email is then received by the user at a step 472 and the activation code is included with the email. Proceeding to a step 474 the user navigates to a preference page on the registration authority application (CustReg) and selects to upgrade their credential. Proceeding to a step 476, system 200/300 receives an activation code from the user as part of the identity and proofing service. In certain embodiments, the activation code is the code previously received via email at step 472. Upon receipt of the activation code from the user, process 400 advances to a function 486 at the identification management service and sets the level of assurance (LOA) at level 2. This is further reflected in the certificate authority database 458. The steps just performed describe single factor authentication and do not enable setting a LoA of Level 3 because that requires multi-factor authentication.

After setting the level of assurance, process 400 ends at an end state 488. In parallel with function 486, the activation code received at step 476 is used at a step 478 to call the registration authority (CustReg) user assertion application programming interface (API). The user assertion API is used by the registration authority to store a change to the level of assurance at function 480 in the CustReg database 482. At the completion of updating the LOA to level 2, module 400 ends at an end step 484.

In some embodiments, at this time, a credential or token is tied to LOA2. The proofing event is bound to the credential or token, and therefore, if there are any changes related to the customer, he or she will need to perform another proofing event.

Returning to the decision state 454, if the verification is not successful, process 400 proceeds to a function 462 where the identity and proofing service creates an opt-in choice page that is sent to the user. At a step 464, the user selects to utilize the in-person proofing (IPP) process. Moving to a function 466, the identification management service initiates the IPP process. Continuing to a function 468, the identification management service generates an IPP instructions email that is sent to the user at state 470 and the process 400 ends. The instructions email informs the user of the in-person proofing process such as performed using the flow described in FIGS. 5a-5f.

FIGS. 5a-5f are flow diagrams of an example flow for an in-person proofing identification process 500 such as identified in FIG. 1. Process 500 includes various entities that perform the steps of the process. In one embodiment, these entities include an identity and proofing system, such as a USPS system 501, a user 502, a registration authority (CustReg) 503, a credential service for knowledge based authentication (KBA) supplier 504, an identity and proofing service (IPS) 505, an identification management (IdM) service for ID management 506, a mobile point of sale (mPOS) application (IPS mobile app) 507, a postal clerk 508 (at a USPS facility), a regional intelligent mail server (RIMS) 509, a mobile delivery device (MDD) system 510, and a postal mail carrier 511. Each of entities 501 through 511 are represented on FIGS. 5a, 5b, 5c, 5d, 5e and 5f by a corresponding horizontal portion of the figures stretching across either FIGS. 5a 5b and 5c or across FIGS. 5d, 5e and 5f. The entities 501-507 and 509-510 are each associated with one or more processors such as shown by the system configuration 200 and/or system architecture 300.

Process 500 begins with the user 502 at a start step 513 and proceeds to step 514 so as to navigate online to a registration step with the registration authority (CustReg), such as at the USPS website. Proceeding to step 515, the registration authority requests the user to perform a log-on. Proceeding to a function 516, the registration authority requests attribute information of the user. Moving to step 517, the user 502 provides the data requested by the registration authority. Continuing to a function 518, the registration authority compares the information received from the user 502 with that requested by the authority and checks a customer registration (CustReg) database 519. Any new information received from a user is stored in the CustReg database 519. Proceeding to a decision step 520, the registration authority determines if the user 502 can be validated based on the provided information from the log-on. If the user cannot be validated as determined at decision step 520, the process 500 continues to a function 521 where the user is notified of the log-on failure, and process 500 ends at an end step 522.

However, if the user has been validated as determined at decision step 520, process 500 continues to a function 523 to redirect to a homepage of an application such as USPS. Proceeding to step 524, the user can select a preference link on the page, and at step 525 selects to upgrade his or her credential. Advancing to a function 526, the registration authority 503 redirects the processing and user to the identity and proofing service 505, and module 500 continues at a function 527. At function 527, the identity and proofing service receives the redirect from the registration authority and presents an upgrade page to the user 502. Advancing to a step 528, the user 502 adds information such as date of birth and social security number and/or other information desired by the process 500. The user-entered information and the user are redirected to a function 529, which redirects to a third party knowledge based authentication (KBA) supplier along with the attributes previously entered.

Proceeding to a function 530, the credential service provider (KBA supplier) 504 receives the redirect at function 530 and performs a lookup of the user using a KBA supplier database 531. Moving to a function 532, the credential service provider generates both questions and proposed answers, and sends this information back to the identity and proofing service 505. Moving to a function 533, the identity and proofing service receives the questions and proposed answers and displays them for the user to see.

In certain embodiments, example questions and answers are provided on a screen such as shown in FIG. 11. Moving to a function 534, the identity and proofing service collects answers from the user and sends the answers to the KBA supplier 504. Moving to a function 535, the credential service provider receives the answers from the identity and proofing service and accesses the KBA supplier database 531. Based on this information, the credential service provider 504 grades the responses and sends a score to the identity and proofing service 505. The algorithms for determining the risk score associated with the attribute bundle are the unique intellectual property of each third party provider. This results in a unique and separate configuration for each integration that the identity and proofing system, such as the USPS system, establishes with each service provider based upon the databases available to the third party. During the integration process, the identity and proofing system provider works with the third party on the various configuration points to achieve an aggregated risk model that is acceptable for the identity and proofing system provider's business needs. For example, for certain USPS applications a score of three of five successfully answered KBA questions would be sufficient. However, for other USPS applications a score of three of five in combination with a successful response on a specific attribute combination could be the threshold. Moving to a decision step 536, the identity and proofing service determines if a verification has been successfully done.

If the verification is successful, module 500 proceeds to the identification management service 506 at a function 537 where an account is created for the user and data is stored in a software solution database 538. Database 538 receives partitioned registration attributes corresponding to each of the users using the identity and proofing service. After the account is created, an activation email is created and sent to the user and then module 500 ends at an end step 540. However, if verification is not successfully completed as determined at the decision step 536, the module 500 proceeds to a function 541 and initiates an in-person proofing process. Proceeding to a function 542, the identification management service generates an in-person proofing instructions email and sends that to the user 502. At a step 543, the user selects the in-person proofing link in the email and then processing advances to a function 544. At function 544, the identity and proofing service 505 generates a record locator and barcode email. The email is sent to the user 502 as email 546 and the information from the email regarding the barcode is stored in an identity and proofing service database 545. An example email illustrating the barcode is shown in FIG. 17A.

If the user has opted to perform the in-person proofing at a business location with an employee (e.g., Post Office with a postal clerk), the process 500 begins this phase at a start step 548. Process 500 then moves to step 549 where the clerk logs-on on mPOS device, or other device for interfacing with the user, using an IPS mobile application at step 549. The clerk selects to log-on to the application and process 500 proceeds to a function 550 where the application presents a challenge to the postal clerk. Proceeding to a step 551, the clerk enters an advanced computing environment (ACE) identifier, for example, and a password. In other embodiments, other identifiers can be used. Module 500 proceeds by storing portions of the information entered by the clerk in a USPS lightweight directory access protocol (LDAP) database 552, for example. The LDAP database 552 is configured to store authentication artifacts and is used to authenticate the clerk's credentials to ensure that the proofing activity is being performed by an authorized agent. The process 500 proceeds to start step 553 then continues on to a function 554 where the IPS mobile application 507 calls the identity and proofing service (IPS) RESTful web service. REST is an architectural style for networked hypermedia applications and is used to build Web services that are lightweight, maintainable, and scalable. A service based on REST is called a RESTful service. REST is not dependent on any protocol, but most RESTful services uses HTTP as their underlying protocol In parallel to calling the RESTful web service, the mPOS displays a barcode scan screen at a function 555. An example barcode scan screen, such shown in FIG. 19, can be utilized.

In parallel to the display of the barcode scan screen, process 500 moves to a function 556 where the RESTful web service uses a fetch record locator and account APIs to fetch a record from an IPS database 545 corresponding to the user and also fetches personally identifiable information by calling a function 557 performed by the registration authority. Function 557 retrieves the personally identifiable information (PII) from the CustReg database 519 which has registration attributes corresponding to the user. Once the RESTful web service obtains the records from the IPS database 545 and the CustReg database 519, the data is joined by IPS 505 at a function 563. In parallel, with at least previous portions of process 500, the user starts at a step 560 and presents the barcode information at step 561 that they have from the email provided back at step 546. The barcode from step 561 is scanned by the clerk at a step 562 such that the barcode from the user's email is obtained.

Proceeding to a function 564, the mobile point of sale device using the IPS mobile application compares the barcode data from the scanned email against the information joined at function 563. Proceeding to a decision step 565, the IPS mobile application on the mPOS determines if there is a data match between the information corresponding to the barcode scanned from the email and the information previously obtained from the CustReg database and the IPS database. If there is no data match as determined at decision step 565, process 500 moves to an error sequence 566 to notify the clerk that there is a lack of a data match. At this point, various error sequences can be performed such as notifying the user that the barcode does not match the previously obtained information. However if the data match at decision step 565 is successful, process 500 proceeds to a function 567 where the clerk requests a first form of identification from the user.

Figure 22:
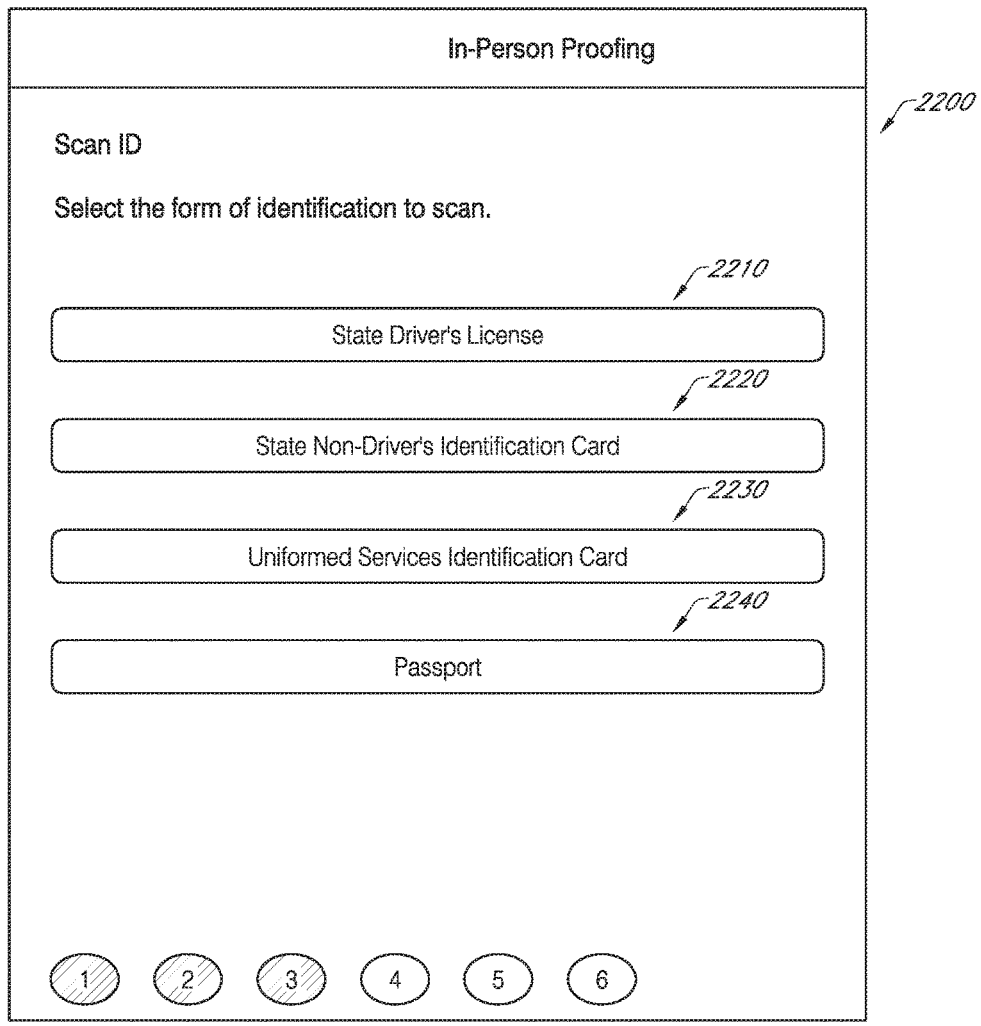
FIG. 22 is an example screen display requesting a selection of an identification to be scanned using the mPOS device.

In certain embodiments, an example screen illustrating the requesting of information of the user is provided at FIG. 21. In this example, the customer is asked for identification to scan on the succeeding screen and all forms of identification must be current. In certain embodiments, accepted forms of identification include: state driver's license, state non-driver's identification card, uniformed services identification card, or passport. In certain embodiments, secondary forms of identification can be accepted, but they may be only required in certain embodiments when the primary identification does not list an address or has an outdated address. These accepted secondary forms of identification can include: a lease, mortgage or deed of trust, a voter or vehicle registration card, or a home or vehicle insurance policy. The clerk can enter the selected form of identification to scan in an example screen such as is shown in FIG. 22 illustrating an mPOS screen to select the form of ID.

Figure 23:
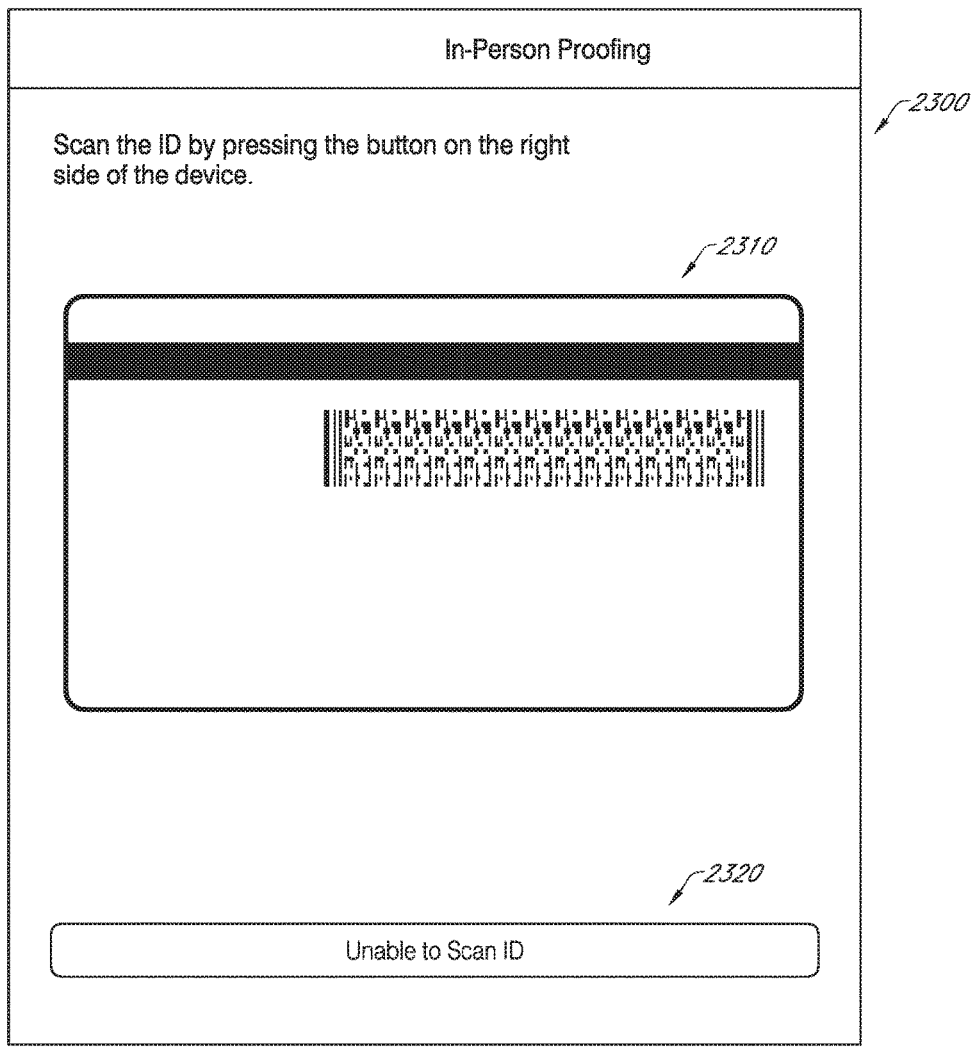
FIG. 23 is an example screen display illustrating the scanning of a sample barcode from the customer's identification using the mPOS device.

Moving to a step 568 the clerk scans this first form of identification that has been selected. An example of a scan using the mPOS device is illustrated in FIG. 23. In certain embodiments, the back of the first form of identification is scanned for a barcode using a PDF417 format. In certain circumstances such as previously mentioned, a secondary form of identification may be requested such as performed at function 569 where the mPOS application displays acceptable second form of ID options. In certain embodiments, the secondary forms of ID are listed on a screen display such as shown in FIG. 24. The address on the secondary form of identification must match the address in the system in certain embodiments and the secondary form of identification must be current to verify the customer's address. Proceeding to a step 570 the clerk selects a form type presented by the user on the mPOS device screen and processing continues at a function 571. At function 571, the mPOS device presents a validate screen to validate the barcode name and address to match that presented by the user's identification. The clerk enters in a yes or no such as shown in the example screen illustrated in FIG. 25. In other embodiments other information may be presented and compared for a validation match.

Figure 26:
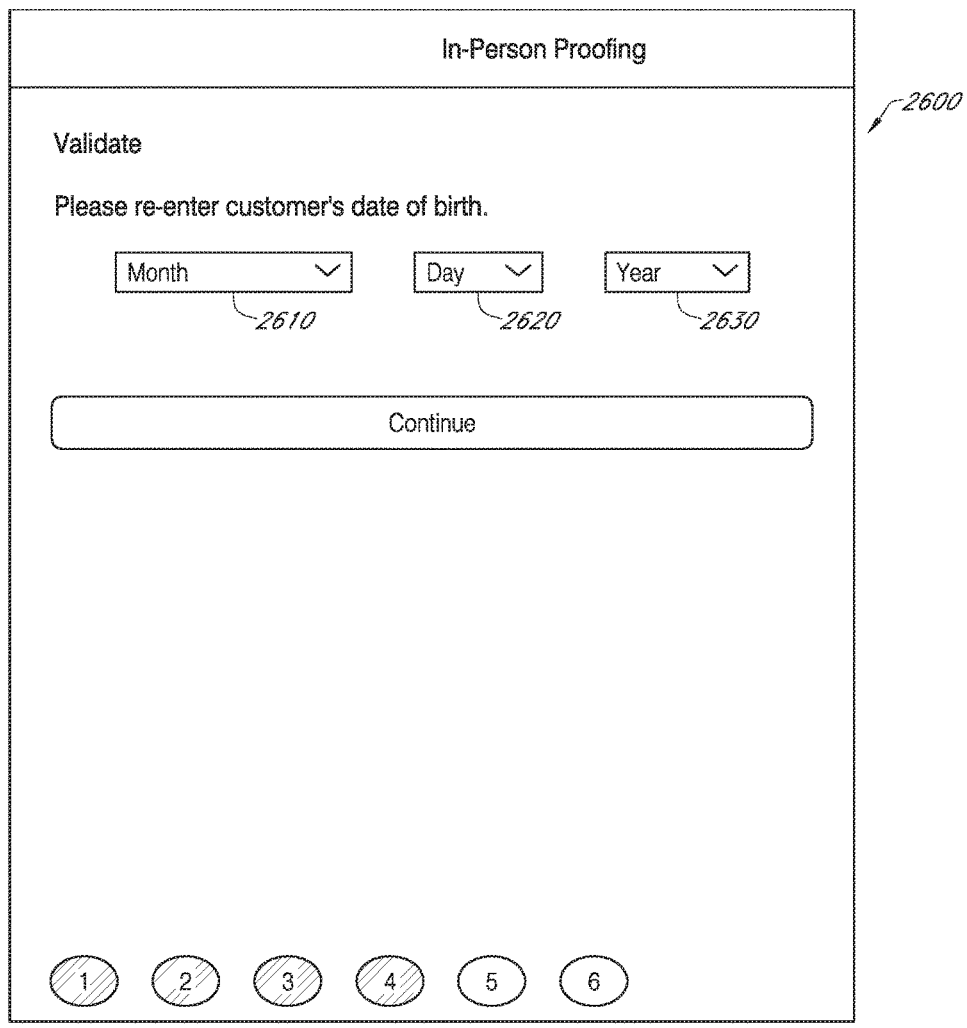
FIG. 26 is an example screen display requesting the user to enter the customer's date of birth as a validation step using the mPOS device.

The clerk validates the match at a decision step 572. If the validation is not correct, the process 500 advances to an error sequence 573. However, if proper correspondence and validation is made, as determined at decision stage 572, the process 500 continues to a function 574 where a birth date entry screen is presented such as to obtain the user's birth date or other user information. An example screen display for part of the validation process where the customer's date of birth is entered is shown in FIG. 26. Process 500 can compare the customer's date of birth against information in CustReg database 519 to verify that there is a match. At that point, process 500 can assert that the proofing is completed and the identity validation is complete. The system can generate a proofing confirmation code and display it on the mPOS device for the clerk and the customer such as shown in FIG. 27. At this time, a credential or token is tied to LOA2. The proofing event is bound to the credential or token, and therefore, if there are any changes related to the customer, he or she will need to perform another proofing event. The customer then receives a confirmation email, SMS or the like with the confirmation code and at that point, the customer can login to the online application (e.g., USPS) at a LOA2 level and perform other functions that are desired. In certain embodiments the clerk can print a hardcopy of the confirmation code for the customer.

In another aspect of the system, process 500 utilizes in-person proofing via a mobile worker (e.g., postal carrier) for the business utilizing a mobile delivery device (MDD) system or similar system. In certain embodiments, the customer can set an appointment for a particular day of the week up to a preset number of days in advance, and can also set up a timeframe window for the validation event at his or her residence, such as for a preset window of hours, e.g., two hours. In this aspect, system 200/300 using the identity and proofing service (IPS) 505 performs a function 576 to send residential in-person proofing events via a database link to a server (e.g., the regional intelligent mail server (RIMS)) nightly, for example, at 2 AM or another predetermined time or in a range of time with low network traffic. In other embodiments, in-person proofing events can be at business locations of the users. At a function 577, the RIMS 509 further distributes one or more residential in-person proofing events preferably at a time with low network traffic to the mobile delivery device of a particular carrier corresponding to one or more particular customers that are on their route. Proceeding to a function 578, the MDD receives the residential in-person proofing events for the particular day of that particular carrier.

In certain embodiments, the MDD resides in a cradle or other location for charging of the battery when the carrier is not out on a route. During this time the MDD receives data for the next period that the carrier is on his or her route. To do so, the MDD cradle includes an Ethernet data connection in addition to providing power for charging the MDD. The data can be transmitted via a hypertext transfer protocol (HTTP), and in certain embodiments, a hypertext transfer protocol secure (HTTPS) is utilized for identity verification, for example, on the communication line on a port of the cradle. In other embodiments, other protocols can be used for data transmission and/or identity verification. In certain embodiments, this data transfer to the MDD occurs during the night such as between midnight to 5 AM, for example. In other embodiments, other times or a set time can be used for transferring the data. This can be done in a batch process for all the MDDs of the business at night so as to conserve bandwidth and cost in comparison to sending data wirelessly to the MDDs while the carriers are on their routes. In certain embodiments, tens of thousands of MDDs may receive data transfers for their routes. During the residential in-person identity verification, information collected during the verification is transferred from MDD to the regional intelligent mail server (RIMS) and then to the identity proofing service (IPS) as the data is collected, in certain embodiments. In other embodiments, the data from one or more MDDs can be transferred in batches at certain times of a day, for example.

A particular business employee or agent (e.g., postal carrier) starts the in-person proofing portion of process 500 at a step 579 and scans his or her identification, e.g., ID badge, at step 580. This event is recorded in the lightweight directory access protocol (LDAP) database 552 as an authentication artifact. Process 500 continues at end/start step 581 and moves to a step 582 where the MDD associates the in-person proofing records to the employee's route. Proceeding to a step 583, the MDD alerts the employee using his or her GPS coordinates and a geofencing function. In certain embodiments, a latitude and longitude along with a radius can be used to establish a geofence around a customer's residence location, In other embodiments, other ways to identify a location such as a zip+4 code can be used. In certain embodiments, when the employee approaches a predetermined distance of the residence of the customer the MDD alerts the employee.

In certain embodiments, screen displays of the MDD showing the notification process are shown in FIGS. 5, 36, 37 and 38 so that the carrier can identify the IPS customers that are within a certain distance from the carrier's location. An example of this is shown on FIG. 38 where there are two customers identified by address and distance. In other embodiments, time of day checks can be made to verify that the carrier is at locations expected for his or her route at certain times of the day. Alternatively or in addition to performing the previously described time of day check, a time of day check can be done to provide an alert to the user on the status of the carrier. For example, an alert can be an email or text message that notifies the customer that the carrier is within a certain timeframe, e.g., 20 minutes, of the user's location, and to please ready your ID materials. Another example can be an alert that is triggered if the carrier is stuck in traffic and is behind his or her schedule by 30 minutes, for example.

When the carrier arrives at the location of the customer, the carrier scans the barcode from the email that the customer has previously received at a step 585. In certain embodiments, an example screen display illustrating the scanning performed during the in-person proofing process is shown at FIG. 39. The scanning of the barcode can be performed using the MDD by pressing a button on the side of the device such as shown in FIG. 40. Proceeding to a step 584, process 500 identifies the customer record and compares the barcode that has been scanned from the user's email hardcopy. In other embodiments, the email can be displayed on a customer's smartphone, tablet, or other devices. Proceeding to a decision state 586, the MDD determines if there is a match between the scanned barcode from the email and the IPS database. If it is determined at decision state 586 that there is no match, process 500 proceeds to a step 587 where system 200/300 causes an error sequence to start which generates and sends or provides a notification to the customer that there is a mismatch between their barcode from their email and previously provided information. However if there is a data match, as determined by decision step 586, process 500 proceeds to a function 588 where system 200/300 causes to display a notification requesting a first form of identification from customer. In certain embodiments, a screen such as shown in FIG. 41 is displayed for the carrier to request identification of the customer including a primary form or a secondary form of identification. In certain embodiments, all the forms of identification must be current. An example screen listing several forms of primary identification is provided in FIG. 42 which displays selections for state driver's license, state non-driver's identification card, uniformed services identification card, or passport.

Proceeding to a step 589, the carrier scans a first form of identification such as selected in FIG. 42. An example of scanning is illustrated in FIG. 43 which indicates that the carrier can scan the barcode or other identifier on the ID by pressing a button on the side of the MDD. In certain embodiments, the back of the first form of identification is scanned for a barcode using a PDF417 standard. Other standards can be used in other embodiments. In certain embodiments, the barcode can have the customer's name, address, and date of birth. Other data collected can be the carrier's name, GPS breadcrumb data, and time of scan. The GPS breadcrumb data can confirm a carrier is travelling along a known or assigned route. The GPS breadcrumb data can be used as further validation that the identity proofing events are valid and trustworthy.

In certain circumstances, a secondary form of ID may be needed such as illustrated in FIG. 44 and described at function 590 where the secondary form options are presented. After the carrier selects a secondary form of identification that the customer has at step 591, the system 200/300 presents a validation screen requesting the carrier to determine if the information provided on the ID(s) presented by the customer matches the information of record in the system as previously provided by the customer at an earlier time. Checking if there is a match of identification information such as barcode ID, name and address, the carrier can select the appropriate yes or no button on the MDD according to whether there is a valid match at a function 592.

If it is determined that the information matches previously stored information at a decision state 593, process 500 advances to a function 595 where the birth date of the customer is requested. However, if the information does not match, as determined at decision state 593, process 500 advances to an error sequence step 594 to notify the customer of the lack of a match with the data. If the match has been made at decision stage 593 and the birth date entry information corresponds to the customer's record of previously obtained information, then the system 200/300 causes the MDD to provides a validation complete screen to the carrier. An example of this is shown in FIG. 47. The system 200/300 also causes a notification to be provided to the customer that the in-person proofing process is complete. At this time, a credential or token is tied to LOA2. The proofing event is bound to the credential or token, and therefore, if there are any changes related to the customer, he or she will need to perform another proofing event. In some embodiments, the system 200/300 generates and sends a confirmation notification with a confirmation number to the customer via email, SMS, and the like. In certain embodiments, certain information collected during the process 400 or process 500, e.g., a SSN, may be purged for customer security once the proofing process is complete.

At this point, the customer can login to the online application (e.g., USPS) at a LOA2 level and perform functions that require a LOA2 using the credentials generated from process 400 or 500. For example, the customer can pay for COD mail, track mail, change a delivery location, or conduct a delivery locker pickup of mailed merchandise. In certain embodiments, if the customer has a mobile computing device with near field communication (NFC) capabilities and selects a link button on his or her confirmation email while the computing device is nearby in NFC range, a token can be downloaded to the computing device. In certain embodiments the token can be a one-time use token such as for picking up merchandise at a delivery locker.

In certain embodiments, remote proofing is attempted first before in-person proofing is offered. That is, the user is by default presented with the remote knowledge based authentication (KBA) prior to receiving the option for in-person proofing. However, in other embodiments, the user can bypass the remote identity verification and be immediately directed to in-person proofing. This service can give users at qualified addresses an option for selecting to perform in-person identity verification at a residential address, a service business location, or a business address of the customer.

Figure 6:
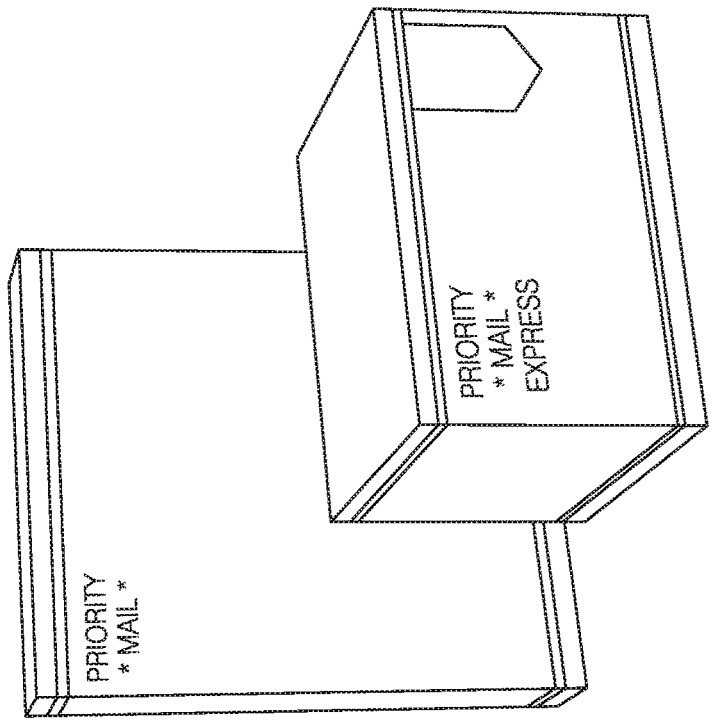
FIG. 6 is an example screen display when a customer desires to use an online application such as the My USPS website.

FIG. 6 is an example screen display when a customer desires to use the online application website (e.g., USPS), for example. In some embodiments, certain actions in the online application can only be made if the customer has a level of assurance (LOA) 2 or better.

Figure 7:
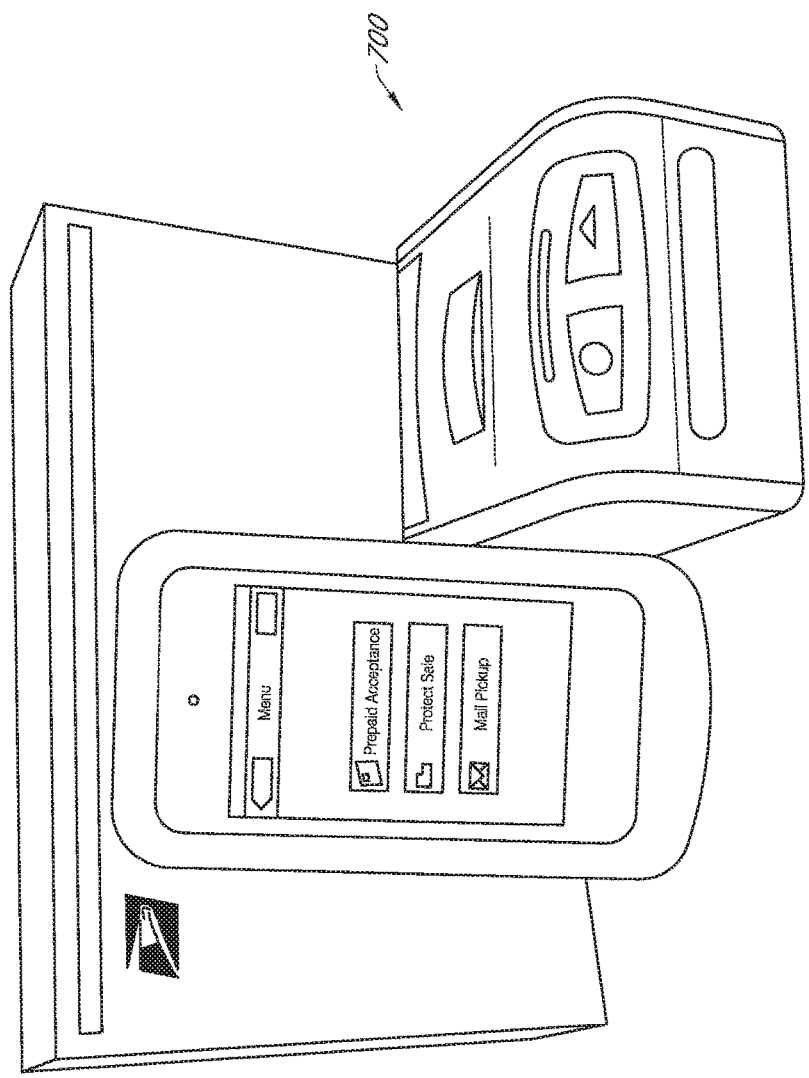
FIG. 7 is an illustration of an example mobile point of sale (mPOS) device, such as utilized in a USPS location.
Figure 8:
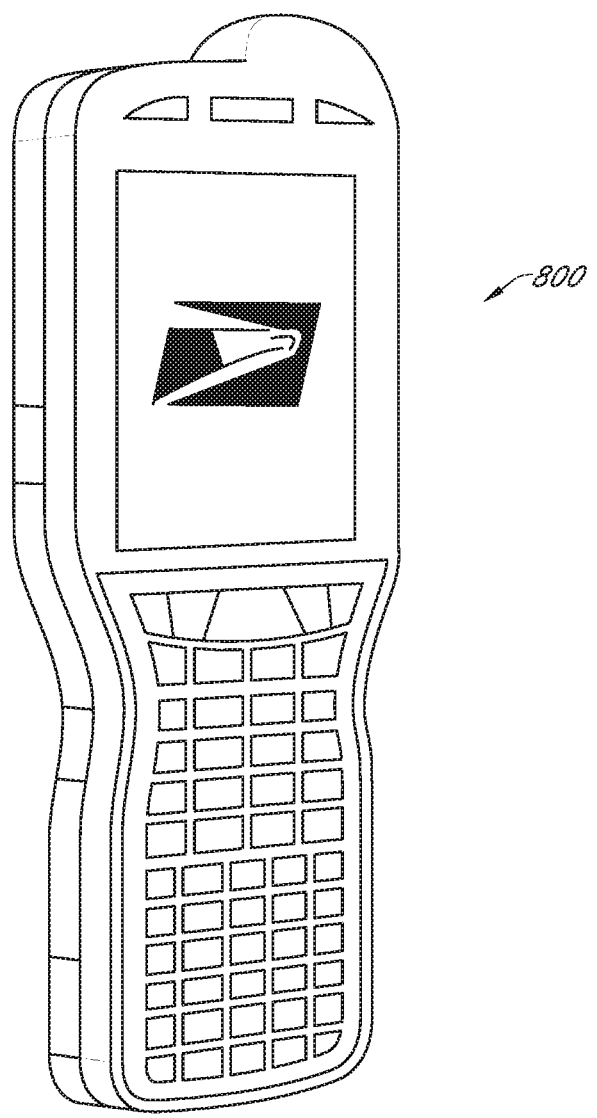
FIG. 8 is an illustration of an example mobile delivery device (MDD) system, such as utilized by a carrier at a delivery location.

FIG. 7 is an illustration of an example mobile point of sale (mPOS) system 700, such as utilized in a business location. The mPOS can be a specialized machine having customized components and functionality configured for use by the business (e.g., USPS). In certain embodiments, the mPOS uses a custom iPod Touch hand-held computing device which is in data communication with a portable receipt printer and a postage printer. In certain embodiments, the mPOS uses the iOS operating system and special purpose software developed to the specifications of the business for the identity verification and other applications it supports. In certain embodiments the mPOS can accept payments by swiping credit cards or non-PIN debit cards. A customer can choose to accept a hard-copy receipt or have one emailed to a personal email address.

FIG. 8 is an illustration of an example mobile delivery device (MDD) system 800, such as utilized by an employee of the business (e.g., carrier) at a delivery location. The MDD includes at least a scanner/imager, a keypad and a display screen as input/output components, and also includes a communications subsystem to receive various communications, such as a list of residential in-person proofing events for the carrier. The MDD also includes a processor and memory for storing at least the residential IPP events and results. The MDD further includes a geographical location component, such as a GPS circuit. The MDD uses the scanner/imager to capture a 2-D barcode or other type of code on a driver's license or other form of acceptable identification for the proofing procedure. In certain embodiments, the scanner/imager is designed for barcode capture. In some embodiments, the MDD can be manufactured by Honeywell and can use the Windows Mobile operating system. In other embodiments, other operating systems can be utilized. Some components of the MDD are specialized for speed, battery consumption, ruggedness, and so forth such that the MDD cannot be considered a general purpose computer. The MDD utilizes special purpose software developed to the specifications of the business (e.g., USPS) for the applications that it supports. This includes the identity verification procedure to guide the user through the proofing procedure.

FIG. 9 is an example screen display 900 when a customer is ready to sign into their account 910 or desires to create a new online application account 920 (e.g., using USPS). If the customer already has an account with the business, a username and password are required to log-in.

FIG. 10 is an example screen display when a customer verifies their account. For added security, some online applications require additional authentication beyond just a username and password. This is to make sure that no one else attempts to see, manage or tamper with the customer's shipments, for example. In the example shown, the customer is requested to enter their date of birth and their social security number to confirm the customer's identity. Answers to these questions are for verification only and neither the business (e.g., USPS) nor its partners store the user's answers. A business partner independently verifies the customer's information to uniquely resolve their identity. The independent service provider generates questions that only the particular customer should be able to answer. In some embodiments, the partner is a knowledge based authentication (KBA) supplier. After the requested information is entered, the customer can select the Get Verified button 1010, for example to start verification.

FIG. 11 is an example screen display 1100 of exemplary verification questions generated by the knowledge base authentication supplier, such as a financial service provider. The service provider generates the verification questions. The business (e.g., USPS) does not keep either the information used to create the questions or the customer's answers. In certain embodiments, the customer must answer every question to verify their identity and address. After the requested information is entered, the customer can select a Submit Answers button 1110, for example.

FIG. 12 is an example screen display 1200 illustrating a customer's preferences summary including an authentication level and a way to upgrade that level. The preferences include communications preferences and security preference information. The customer's current authentication level is listed along with an upgrade selection 1210 when the authentication level can be upgraded. If the authentication level can be upgraded, remote proofing such as shown in FIGS. 4a-4c or in-person proofing such as shown in FIGS. 5a-5f is performed. In certain embodiments, remote proofing using KBA is performed prior to receiving the option for IPP. However, in other embodiments the customer can bypass the remote identity verification and be immediately directed to in-person proofing. This can give customers at qualified addresses an option for selecting to perform in-person identity verification at a residential address, a postal location, or a business address.

Figure 13:
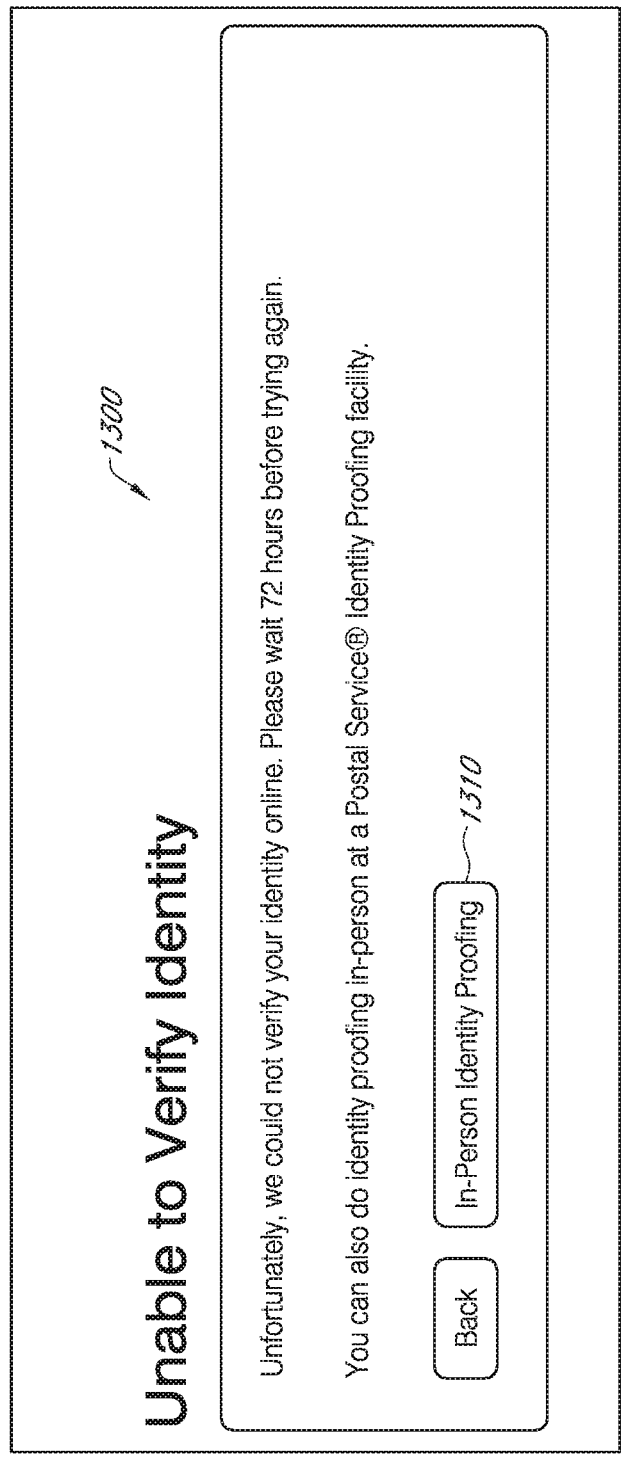
FIG. 13 is an example screen display illustrating a screen showing when the system could not verify the customer's identity online and options to wait a predetermined amount of time before remote proofing can be utilized or an option for in-person proofing.

FIG. 13 is an example screen display 1300 when the system could not verify the customer's identity online via remote proofing. The customer can wait a predetermined amount of time, such as 72 hours or another amount of time that is higher or lower than 72 hours, before remote proofing can be utilized again. Alternatively, the customer can select an in-person identity proofing button 1310, for example.

Figure 14:
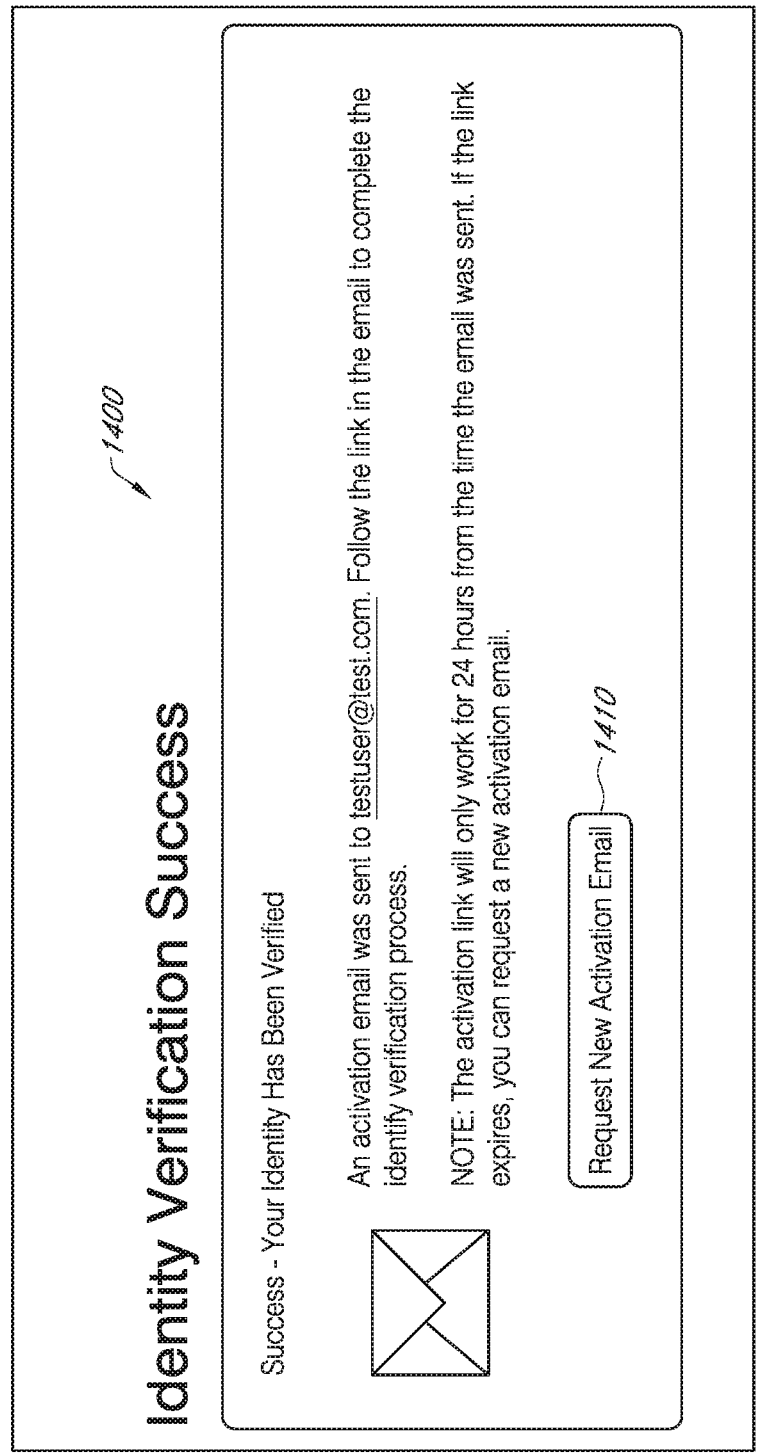
FIG. 14 is an example screen display illustrating a screen showing when the system can successfully verify the customer's identity.

FIG. 14 is an example screen display 1400 when the system has verified the customer's identity. An activation email having an activation link is sent to the email address of the customer. The customer needs to select the link in the email to complete the identity verification process. In certain embodiments the activation link is valid for a predetermined amount of time from the time the email is sent to the customer. If the link expires, the customer can request a new activation email by selecting a request button 1410 on the display, for example.

Figure 15:
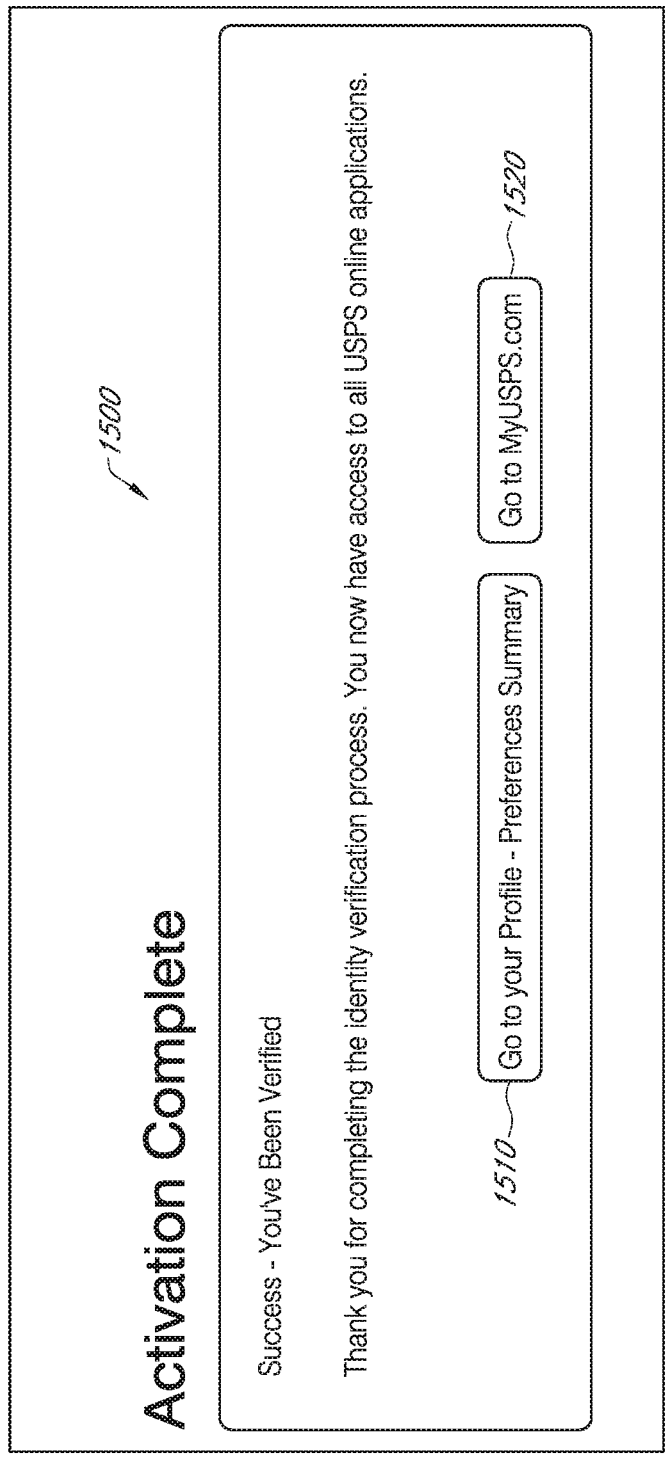
FIG. 15 is an example screen display illustrating a screen showing when activation of the customer's verified identity is complete.

FIG. 15 is an example screen display 1500 when activation of the customer's verified identity is complete. In this example, the customer has successfully completed the identity verification process and therefore has access to online applications requiring LOA-2. Options are provided to go to a profile-preferences summary 1510 or to go to the MyUSPS website 1520, for example.

Figure 16:
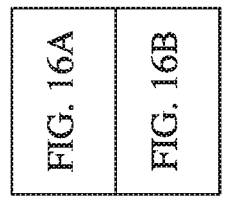
FIG. 16, comprising

FIGS. 16A-16B are an example screen display 1600 when in-person proofing has been selected to verify the customer's identity. The online application sends an email with instructions regarding in-person proofing to the email address previously provided by the customer. The in-person proofing request is active for a predetermined number of days, e.g., 30 days, from the time that the email is sent. If the request expires, the customer can either request a new in-person proofing email 1610 or retry to verify their identity online via remote proofing 1620. In certain embodiments, a list 1630 of nearby identity proofing facilities is provided to the customer.

Figure 17:
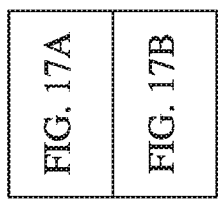
FIG. 17, comprising
Figure 17A:
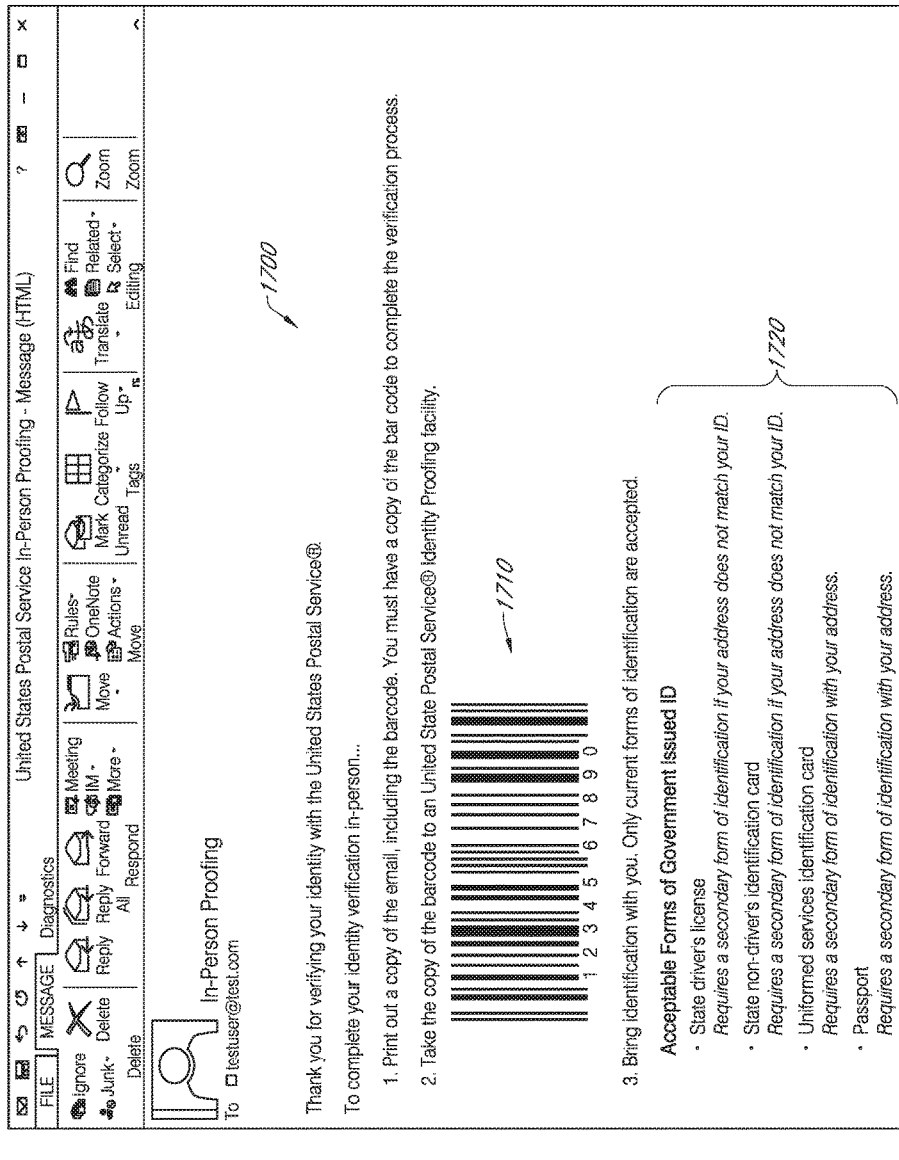

FIGS. 17A-17B are an example screen display 1700 of an email having a barcode 1710 sent to the customer when in-person proofing has been selected. In some embodiments, the barcode encodes certain information about the customer, and is used when the customer interfaces directly with an employee, clerk or carrier as described herein. The screen display can also provide a list of acceptable forms of identification documents 1720, such as government-issued documents, and acceptable secondary forms of identification 1730.

FIG. 18 is an example screen display 1800 such as shown on a mobile point of sale (mPOS) system as used by an employee, clerk or agent to verify the customer's identity when the customer is at the service business location. In certain embodiments, the clerk initiates a sign-in to his or her account by entering an advanced computing environment (ACE) identifier and password. Other identifiers may be used in other embodiments. The clerk can then proceed by selecting a Sign-In bar 1830, for example.

FIG. 19 is an example screen display 1900 such as shown on the mPOS system to scan the barcode from the email previously sent to the customer. In certain embodiments, the clerk or agent requests the customer to show the email with barcode which is then scanned by selecting a Scan Barcode bar 1920, for example. If the barcode cannot be scanned, the clerk can manually enter the numbers corresponding to the barcode at a barcode ID location 1920 and selecting a Submit bar 1930. In certain embodiments, a series of numbered indicators 1940 indicates by color or other way of highlighting a current step number of the IPP identification and verification process.

Figure 20:
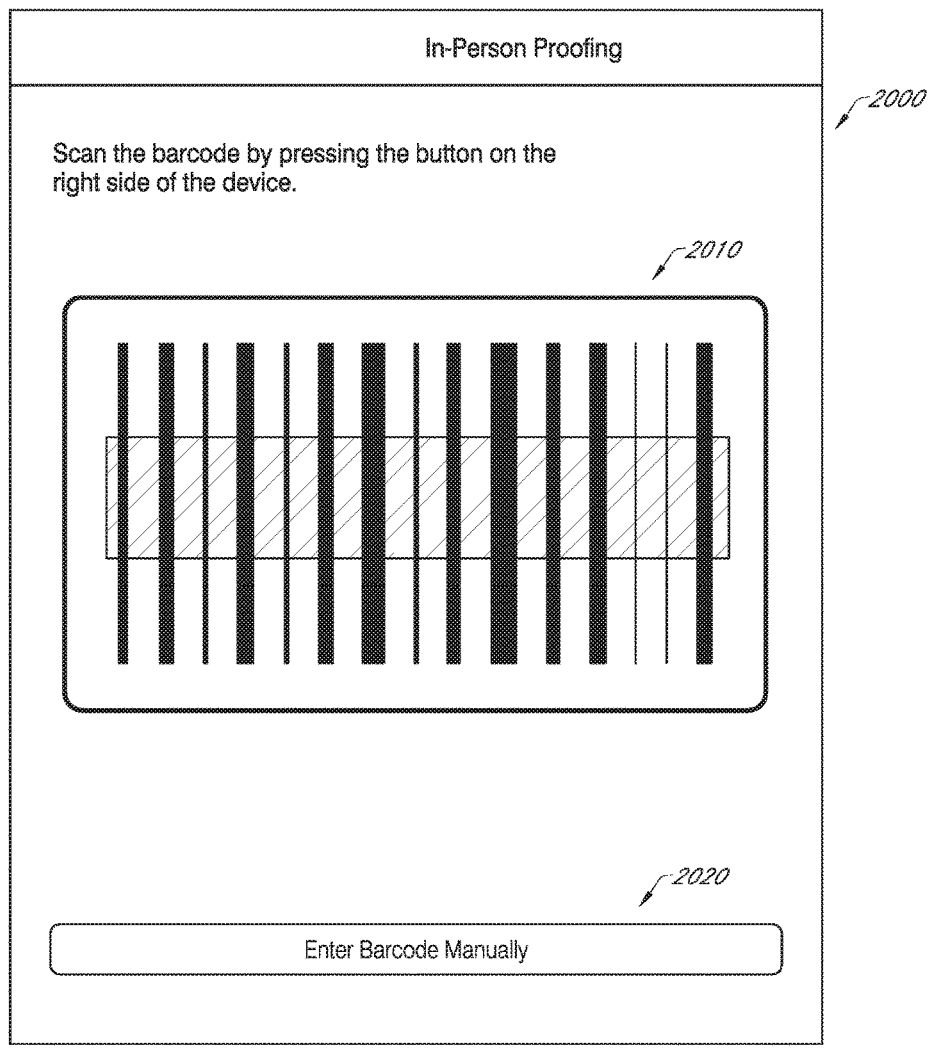
FIG. 20 is an example screen display illustrating the scanning of a sample barcode from the customer's email using the mPOS device.

FIG. 20 is an example screen display 2000 illustrating the scanning of a sample barcode 2010 from the customer's email using the mPOS system. If the barcode cannot be scanned, the clerk can select an Enter Barcode Manually bar 2020 on the screen display for the mPOS system so as to type in the numbers corresponding to the barcode.

FIG. 21 is an example screen display 2100 requesting one or more of certain forms of identification using the mPOS system. In certain embodiments, accepted primary forms of identification 2110 include: a state driver's license, a state non-driver's identification card, a uniformed services identification card, or a passport. In certain embodiments, accepted secondary forms of identification 2120 are only required when the primary identification does not list an address or has an outdated address, for example. These accepted secondary forms of identification can include: a lease, a mortgage or deed of trust, a voter or vehicle registration card, or a home or vehicle insurance policy. The clerk can continue the IPP process by selecting a Next bar 2130.

FIG. 22 is an example screen display 2200 requesting a selection of a primary identification to be scanned using the mPOS system. The clerk can select one of the following: a state driver's license bar 2210, a state non-driver's identification card bar 2220, a uniformed services identification card bar 2230, or a passport bar 2240. The system then prepares to scan an ID corresponding to the selected type.

FIG. 23 is an example screen display 2300 illustrating the scanning of a sample barcode from the customer's identification 2310 using the mPOS system. The customer's identification is of the type selected in FIG. 22. In certain embodiments, the barcode can be located on the back of the identification. The scan can be initiated by pressing a button on the mPOS as instructed on the screen display. If the clerk is unable to scan the customer's ID, the clerk can select an Unable to Scan ID bar 2320.

FIG. 24 is an example screen display 2400 requesting a selection of a second form of identification using the mPOS system, such as when the first form of identification does not have an address or has an outdated address. In certain embodiments, the address on the secondary form of identification must match the address in the system and must be current. The clerk can select one of the following: a lease, mortgage or deed of trust bar 2410, a voter or vehicle registration card bar 2420, a home or vehicle insurance policy bar 2430 or a no secondary form of ID provided bar 2440.

FIG. 25 is an example screen display 2500 requesting to validate the presented form(s) of identification against the information previously provided by the customer. The clerk is to compare the information from the presented form(s) of identification against the customer's information listed on the screen display. The clerk can then select a Yes bar 2510 or a No bar 2520 according to whether the data matches.

FIG. 26 is an example screen display 2600 requesting the clerk to enter the customer's date of birth as a validation step using the mPOS system. Drop down menus or other means for entry of the Month 2610, Day 2620 and Year 2630 of the customer's birth date are provided.

FIG. 27 is an example screen display 2700 illustrative of completing the proofing and presenting a validation proofing confirmation code 2710 using the mPOS system. The clerk can print the confirmation using the Print Confirmation Code bar 2720 and/or select a Continue bar 2730.

Figure 28:
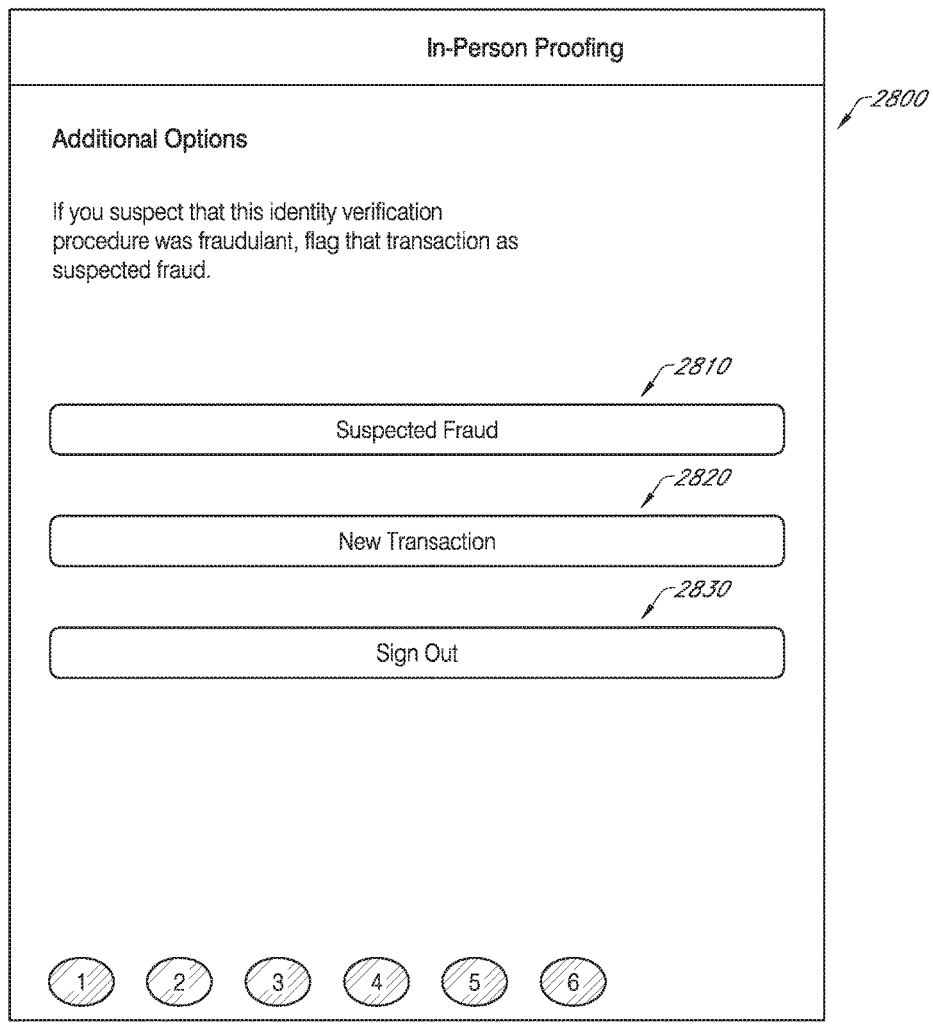
FIG. 28 is an example screen display illustrative of additional options such as a way of using the mPOS device to indicate suspected fraud in the verification procedure.

FIG. 28 is an example screen display 2800 illustrative of additional options such as a way of using the mPOS system to indicate suspected fraud in the verification procedure using a Suspect Fraud bar 2810. Other options can be shown, such as a New Transaction bar 2820 or a Sign-out bar 2830.

Figure 29:
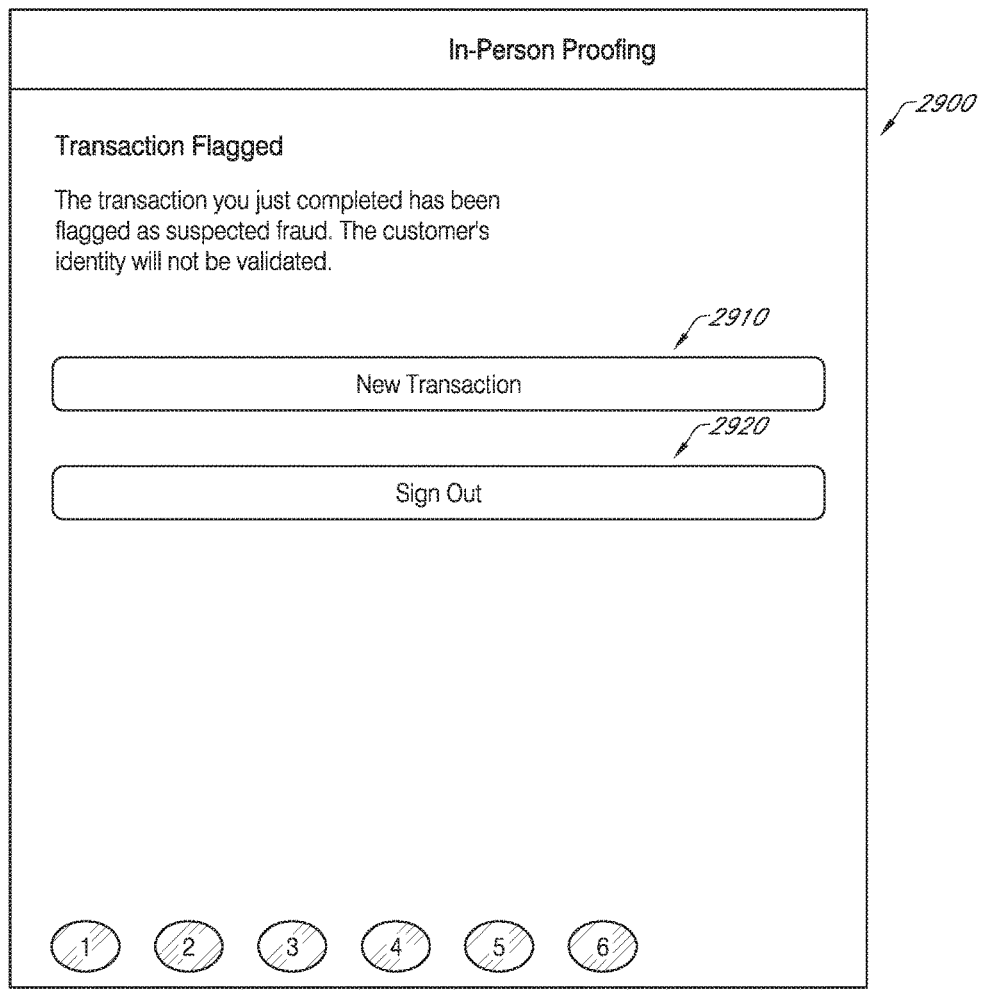
FIG. 29 is an example screen display that indicates that the suspected fraud in the verification procedure has been flagged and the customer's identity is not validated.

FIG. 29 is an example screen display 2900 which indicates that the suspected fraud (selected in the screen display of FIG. 27) in the verification procedure has been flagged and the customer's identity is not validated. A New Transaction bar 2910 is provided as an option for continuing or a Sign-out bar 2920 can be used when the clerk desires to sign out of the IPP process.

FIG. 30 is an example screen display 3000 illustrative of a mismatch in a prior step and options for a secondary form of identification having a current address of the customer. The IPP process shows this screen display because the address of the primary form of identification did not match the address previously provided by the customer, for example. The clerk can select one of the following: a lease, mortgage or deed of trust bar 3010, a voter or vehicle registration card bar 3020, a home or vehicle insurance policy bar 3030 or a no secondary form of ID provided bar 3040.

Figure 31:
FIG. 31 is an example screen display illustrative of options to provide a way to access a federal agency using one of a customer's existing online accounts on an embedded selector screen of the agency website.

FIG. 31 is an example screen display 3100 illustrative of options to provide a way to access a entity such as a business or government agency using one of a customer's existing online accounts on an embedded selector screen of the entity's website. The cost to agencies to manage credentialing systems has grown significantly in recent years at the same time the agencies are being required to move their services online, and when the number of people needing to use public online services is growing. However, requiring users to get individual digital credentials for each agency or business they interact with is burdensome for them and not a good use of resources. This is driving the need for a more integrated, easier-to-use services log-in system. If the customer has an existing online account with at least one of the following example entities, the customer can select one of them to initiate the access of the agency: Google, Verizon, Symantec, Paypal, AFPKI, or VeriSign. In other embodiments, other access entities can be used. In certain embodiments, the USPS works with various agencies that have public-facing websites requiring credentials for access. When citizens visit one of these websites, they can choose from a list of approved credential providers and use that credential to log into the agency website. In certain embodiments, the USPS hosts the technology service that enables the credential issued by the approved provider to be used at the agency.

Figure 32A:
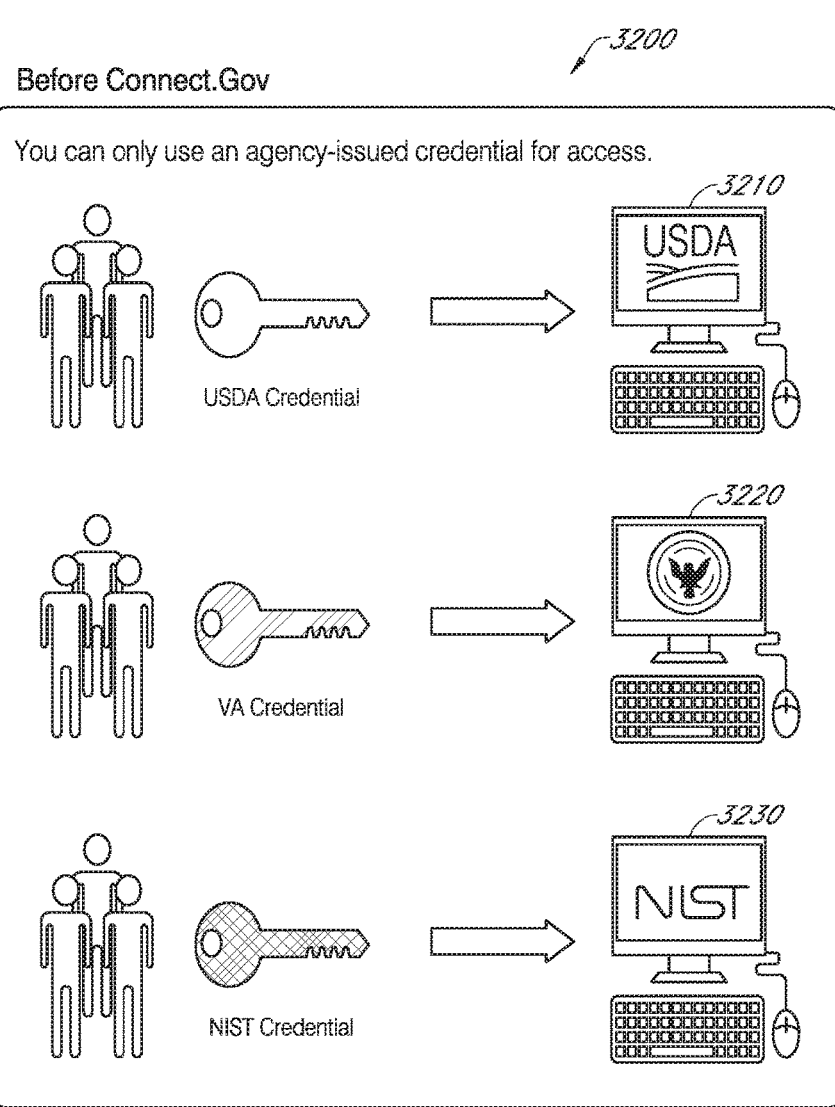
FIG. 32A is a diagram illustrating a prior way of accessing a government agency using an agency issued credential.

FIG. 32A is a diagram illustrating a prior way 3200 of accessing an agency using an agency issued credential. In this example display, each of the U.S. Department of Agriculture (USDA) 3210, the Veteran Affairs (VA) 3220 and National Institute of Standards and Technology (NIST) 3230 requires an agency-issued credential to access a corresponding agency.

Figure 32B:
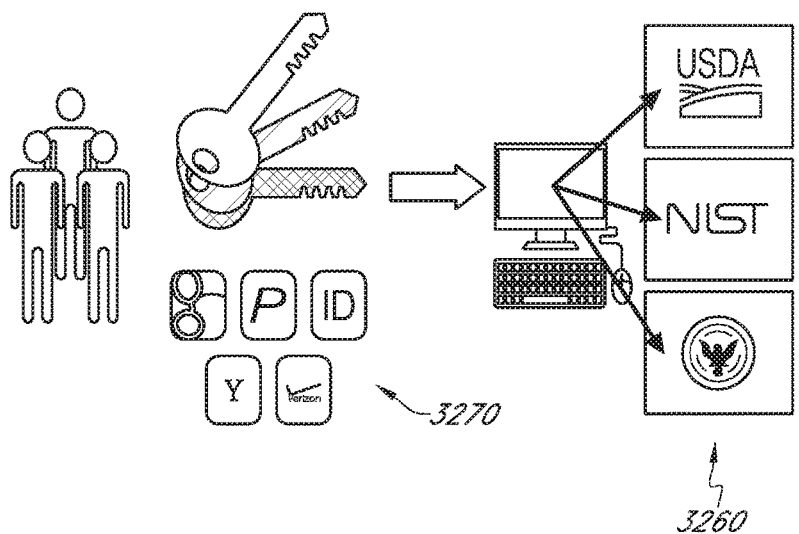
FIG. 32B is a diagram illustrating an improved way to access multiple government agencies using one of a customer's existing online accounts, e.g., USPS, for a single third party credential via a connect service platform.

FIG. 32B is a diagram illustrating an improved way 3250 to access multiple agencies 3260 using one of a customer's existing online accounts 3270, e.g., USPS, for a single third party credential via a Connect service platform, for example.

Figure 33:
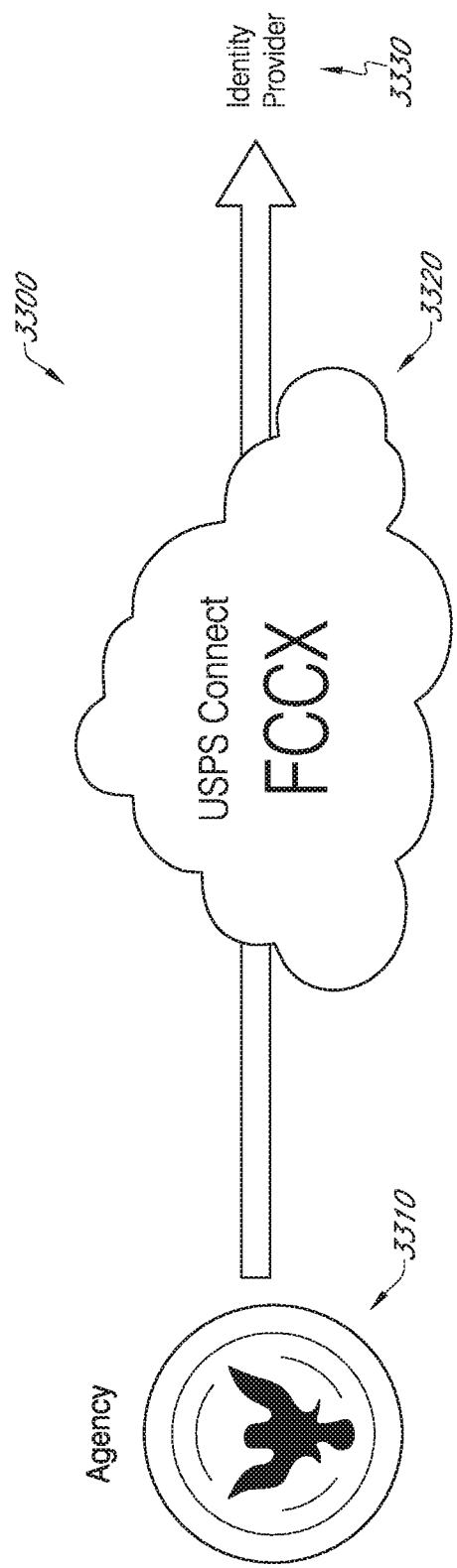
FIG. 33 is an example screen display illustrative of a customer's browser being routed via a government service platform to an identity provider's log-in page.

FIG. 33 is an example screen display 3300 illustrative of a customer's browser being routed via a service platform 3320 for one 3310 of multiple agencies to an identity provider's log-in page 3330. In one embodiment, a Federal Cloud Credential Exchange (FCCX) service platform can be used. FCCX has privacy-enhancing technologies that prevent FCCX from having access to an individual's identity, or to store personal information about the individual. It is designed to pass the credentials between the approved provider and the agency. FCCX also provides other safeguards around the relationships between an agency and its individual customers, such as preventing credential providers from knowing what entity websites the individuals are accessing using their credentials. In certain embodiments, FCCX is referred to as USPS Connect. In certain embodiments, USPS Connect is a technology solution "middleman" within the Connect.gov service platform that make it simpler for individuals to bring their own credentials from an approved external credential service provider and use them to log in to entity websites.

Figure 34:
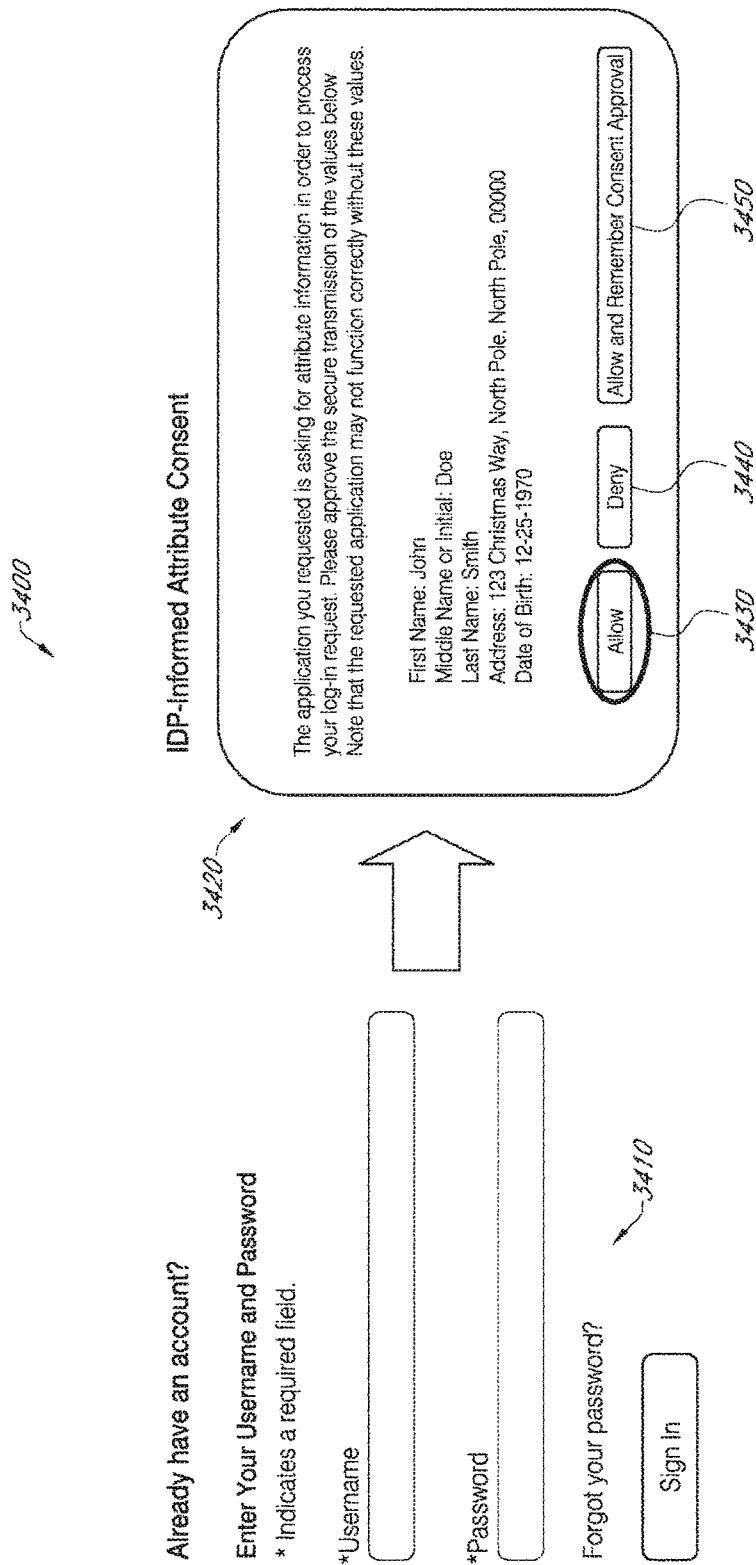
FIG. 34 is an example screen display illustrative of a customer log-in to the identity provider's website and providing a consent to allow attributes to be shared.

FIG. 34 is an example screen display 3400 illustrative of a customer log-in 3410 to the identity provider's website and illustrating an informed attribute consent dialog 3420 regarding the customer's attributes to be shared. The customer can select an Allow bar 3430, a Deny bar 3440, or an Allow and Remember Consent Approved bar 3450.

Figure 35:
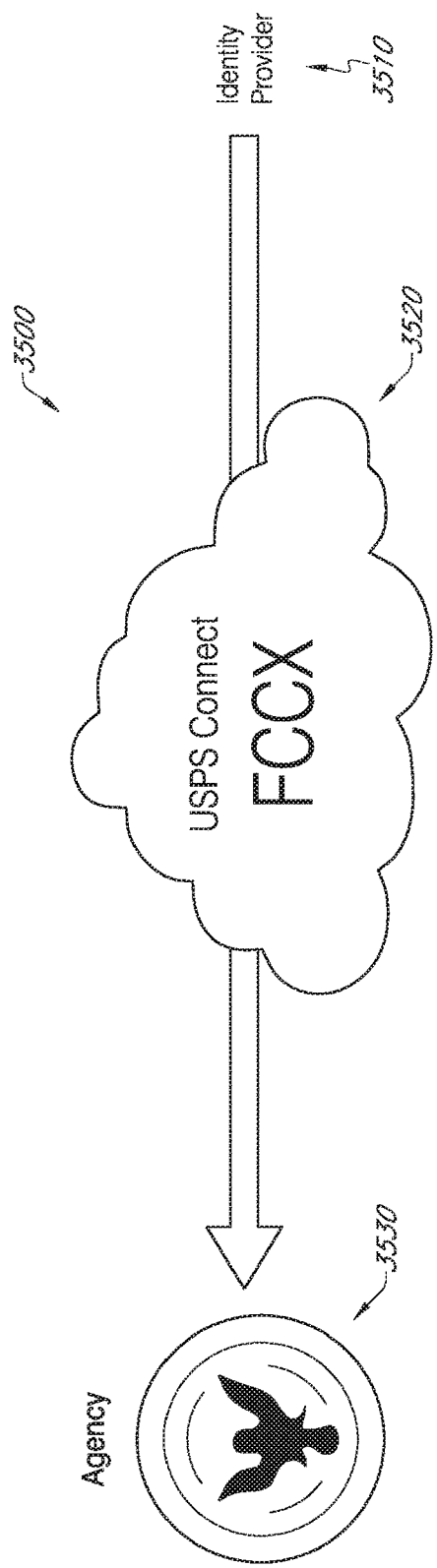
FIG. 35 is an example screen display illustrative of the identity provider sending a credential assertion and attributes via a government service platform to the requesting agency.

FIG. 35 is an example screen display 3500 illustrative of the identity provider 3510 sending a credential assertion and attributes via a service platform 3520 to the requesting agency 3430. The credential assertion and attributes are sent when the customer has selected to Allow the attributes to be shared as illustrated in the example of FIG. 34.

Figures 36, 37, 38:
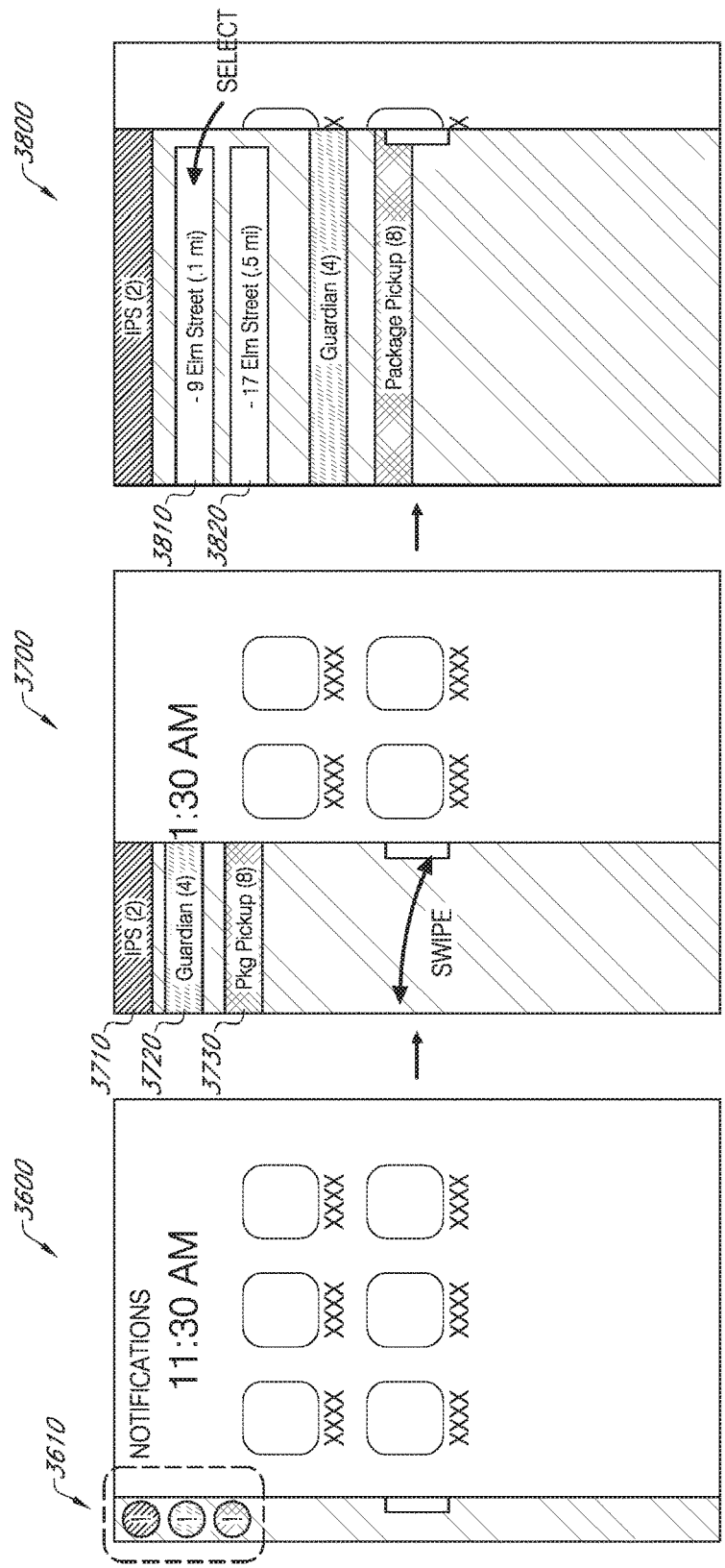
FIG. 36 is an example screen display with coded carrier notifications such as shown on a mobile delivery device (MDD) system as used by a postal carrier on their route to verify the customer's identity in person at a customer location.
FIG. 37 is an example screen display with expanded carrier notifications indicative of two Identity Proofing Services (IPS) stops to be made along with eight package pickups to be made such as shown on the MDD system.
FIG. 38 is an example screen display with expanded carrier notifications indicative of addresses and distances for the IPS stops to be made and receiving a selection of one location such as shown on the MDD system.

FIG. 36 is an example screen display 3600 with coded carrier notifications such as shown on a mobile delivery device (MDD) system as used by a carrier on their route to verify the customer's identity in person at a customer location. On a portion of the MDD there are notification icons 3610 to notify the carrier of an upcoming activity.

FIG. 37 is an example screen display 3700 with expanded carrier notifications made visible by a gesture on the screen of the MDD such as with a swipe. In this example, expanded carrier notifications are indicative of two Identity and Proofing Services (IPS) stops 3710 to be made, four Guardian events 3720 and eight package pickups 3730 to be made such as shown on the MDD system.

FIG. 38 is an example screen display 3800 with further expanded carrier notifications indicative of addresses and distances from the current location for the IPS stops 3810 and 3820 to be made. The example screen display indicates receiving a selection of stop 3810 such as shown on the MDD.

FIG. 39 is an example screen display 3900 with a choice of barcode scan 3910 or barcode identifier entry 3920 selection of a customer's barcode previously obtained from the business such as shown on the MDD system. The carrier then selects the Submit bar 3930 to proceed.

FIG. 40 is an example screen display 4000 of in-person proofing illustrative of scanning the customer's barcode 4010 such as shown on the MDD system. In certain embodiments, the scan can be initiated by pressing a button on the MDD.

FIG. 41 is an example screen display 4100 of in-person proofing illustrating instructions for the carrier to request a current primary and/or secondary form of identification such as shown on the MDD system.

FIG. 42 is an example screen display 4200 of the in-person proofing process requesting a selection of a primary form of identification to be scanned such as shown on the MDD system. The carrier can select one of the following: a state driver's license bar 4210, a state non-driver's identification card bar 4220, a uniformed services identification card bar 4230, or a passport bar 4240. In other embodiments, other forms of identification can be utilized. The system then prepares to scan an ID corresponding to the selected type.

FIG. 43 is an example screen display 4300 of in-person proofing illustrative of scanning the selected form of identification 4310 such as shown on the MDD system. In certain embodiments, the scan can be initiated by pressing a button on the MDD system.

FIG. 44 is an example screen display 4400 of in-person proofing requesting a selection of a secondary form of identification to be viewed, if provided, such as shown on the MDD system. The agent or carrier can select one of the following: a lease, mortgage or deed of trust bar 4410, a voter or vehicle registration card bar 4420, a home or vehicle insurance policy bar 4430 or a no secondary form of ID provided bar 4440.

FIG. 45 is an example screen display 4500 of in-person proofing requesting validation of the presented form of identification against the customer information previously presented such as shown on the MDD system. The carrier is to compare the information from the presented form(s) of identification against the customer's information listed on the screen display. The carrier can then select a Yes bar 4510 or a No bar 4520 according to whether the data matches.

FIG. 46 is an example screen display 4600 of in-person proofing illustrative of additional options such as a way of using the MDD system to indicate suspected fraud in the verification procedure using a Suspect Fraud bar 4610. In certain embodiments, the carrier or agent can choose to wait to enter the suspected fraud selection until after he or she leaves the residence location as a safety precaution. Other options can be shown and selected, such as a New Transaction bar 4620 or a Sign-out bar 4630.

FIG. 47 is an example screen display of in-person proofing illustrating that the validation is complete and a validation email is being sent to the customer such as shown on the MDD system. When the proofing is completed, an identity validation proofing confirmation code 4710 is presented. The carrier can then select a Continue bar 4720.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of validating an upgrade of authentication credentials comprising:
   receiving from an authenticated first user, using a first user computing system and a network, input identifying a customer name for an online account;
   receiving, from the first user computing system, a selection indicating a first location of a validation event;
   authenticating a mobile second user, the mobile second user being a person employed by or an agent of an entity;
   receiving real-time geographic coordinates of a second user specialized computing system during a period when the mobile second user is traversing a preassigned route;
   receiving a current time of day along with the real-time geographic coordinates;
   determining whether the mobile second user is at a location on the second user's preassigned route at a time of day within a predetermined window of time;
   providing a notification to the mobile second user when the second user computing system is within a predetermined distance from the first location of the validation event based on the received real-time geographic coordinates;
   presenting, to the mobile second user, a customer name;
   receiving, from the second user computing system, input indicating a result of the validation event; and
   creating a credential or token for the first user based on the received input for the validation event.

2. The method of claim 1, wherein the second user computing system comprises a scanner and a global positioning system circuit.

3. The method of claim 1, further comprising determining whether the second user is physically located at the first location corresponding to the selected validation event.

4. The method of claim 1, further comprising digitally signing the result and transmitting the digitally signed result to the first user.

5. The method of claim 1, further comprising presenting a barcode associated with the selected validation event, wherein the input indicating a result comprises the barcode.

6. The method of claim 1, further comprising:
   presenting, to the first user computing system, one or more attributes of the online account; and
   receiving, from the first user computing system, input indicating at least a partial address.

7. The method of claim 1, further comprising receiving, from the first user computing system, input indicating a type of identification to be presented at the validation event for the online account.

8. The method of claim 1, further comprising changing a government defined level of assurance from level one to level two when the credential or token for the first user is created.

9. The method of claim 1, wherein one or more additional validation events for locations corresponding to one or more users in addition to the first user are provided to the mobile second user before beginning the preassigned route.

10. The method of claim 1, wherein the selection for the first location of the validation event includes selecting between an entity facility and a customer address, and further comprises receiving, from the first user, input indicating the first location of the validation event is one of 1) the entity facility and 2) the customer address.

11. The method of claim 1, additionally comprising receiving a current day of week, and wherein determining whether the mobile second user is at a location on the second user's preassigned route includes determining whether the mobile second user is at the location on the second user's preassigned route at a time of day corresponding to the current day of the week within a predetermined window of time.

12. A system for validating an upgrade of authentication credentials comprising:
   a networked computing device including one or more processors operably configured to access one or more storages,
   wherein the one or more processors is operably configured to:
   receive, from an authenticated first user, using a first user computing device, input identifying a customer name for an online account;
   receive, from the first user computing device, a selection indicating a first location of a validation event;

authenticate a mobile second user, the mobile second user being a person employed by or an agent of an entity; and a mobile second user mobile specialized computing device including a global positioning system circuit, a display and one or more processors operably configured to:

receive a validation event including the first location for the first user;

receive real-time geographic coordinates of the location of the mobile second user during a period when the mobile second user is traversing a preassigned route;

receive a current time of day along with the real-time geographic coordinates;

determine whether the mobile second user is at a location on the second user's preassigned route at a time of day within a predetermined window of time;

provide a notification to the mobile second user when the second user computing device is within a predetermined distance from the first location of the validation event;

present, to the mobile second user, a customer name;

indicate a result of the validation event; and create a credential or token for the first user based on the result of the validation event.

13. The system of claim 12, wherein a successful verification event is bound to a credential or token for a government defined level of assurance.

14. The system of claim 12, wherein the result comprises a confirmation code displayable on the second user's display to the first user and/or sendable with a confirmation message to the first user's computing device.

15. The system of claim 12, wherein the credential or token is tied to a mobile computing device of the first user.

16. The system of claim 12, wherein the selection for the first location of the validation event includes selecting one of an entity facility and a customer address, and further comprises receiving, from the first user, input indicating the first location of the validation event is one of 1) the entity facility and 2) the customer address.

17. A system for validating an upgrade of authentication credentials comprising:

a set of networked computing devices, each computing device including one or more processors operably configured to access one or more storages, wherein selected computing devices are operably configured to:

receive, from a first user authenticated via access to a first storage, input identifying a customer name for an online account;

receive, from the first user, input indicating a first location of a validation event;

authenticate a mobile second user, having a mobile computing device including a global positioning system circuit, via access to a second storage, the mobile second user being a person employed by or an agent of an entity;

receive real-time geographic coordinates of the location of the mobile second user during a period when the mobile second user is traversing a preassigned route;

receive a current time of day along with the real-time geographic coordinates;

determine whether the mobile second user is at a location on the second user's preassigned route at a time of day corresponding to the day of the week within a predetermined window of time;

provide a notification to the mobile second user when the mobile second user is within a predetermined distance from the first location of the validation event;

present, to the mobile second user, a customer name;

indicate a result of the validation event; and create a credential or token for the first user based on the result of the validation event.

\* \* \* \* \*